United States Patent
Kamath et al.

(10) Patent No.: US 6,754,696 B1
(45) Date of Patent: Jun. 22, 2004

(54) EXTENDED FILE SYSTEM

(75) Inventors: Vivek P. Kamath, Redmond, WA (US); Craig S. Brown, Bothell, WA (US); John B. Pence, Renton, WA (US); M. Chandra Shekaran, Woodinville, WA (US); Thomas G. Lorimor, Redmond, WA (US); Thomas R. Firman, Bellevue, WA (US); Elizabeth J. Gentile, Seattle, WA (US); Keith M. Toussaint, Seattle, WA (US)

(73) Assignee: Micosoft Corporation, Redmond, WA (US)

(*) Notice: Subject to any disclaimer, the term of this patent is extended or adjusted under 35 U.S.C. 154(b) by 0 days.

(21) Appl. No.: 09/535,058

(22) Filed: Mar. 24, 2000

(Under 37 CFR 1.47)

Related U.S. Application Data

(60) Provisional application No. 60/171,995, filed on Dec. 23, 1999, and provisional application No. 60/126,094, filed on Mar. 25, 1999.

(51) Int. Cl.[7] .................................... G06F 15/167
(52) U.S. Cl. .................. 709/213; 709/218; 709/219; 709/203; 707/3
(58) Field of Search ....................... 709/203, 213, 709/218, 219; 707/3

(56) References Cited

U.S. PATENT DOCUMENTS

| 3,735,360 A | * | 5/1973 | Anderson et al. ........... 711/149 |
| 5,721,916 A | * | 2/1998 | Pardikar ....................... 707/201 |
| 5,893,920 A |   | 4/1999 | Shaheen et al. |
| 6,243,760 B1 | * | 6/2001 | Armbruster et al. ........ 709/243 |
| 6,260,061 B1 | * | 7/2001 | Krishnan et al. ........... 709/213 |
| 6,269,371 B1 | * | 7/2001 | Ohnishi ....................... 707/10 |
| 6,578,054 B1 | * | 6/2003 | Hopmann et al. ........... 707/201 |

FOREIGN PATENT DOCUMENTS

| EP | 0 713 183 | 5/1996 |
| JP | 10 149310 | 2/1998 |
| WO | WO 98/22881 | 5/1998 |

OTHER PUBLICATIONS

Huizinga et al., "Mobile File System Support with Virtual Device Drivers," *Proceedings of the 1999 ACM Symposium on Applied Computing,* San Antonio, TX, pp. 373–381 (Mar. 2, 1999).

Schroeder, et al., "A Caching File System for a Programmer's Workstation," *Proceedings of the ACM Symposium on Operating System Principles,* Association for Computing Machinery, pp. 25–34 (Dec. 1, 1985).

Copy of International Search Report from corresponding PCT Application No. PCT/US00/07973 mailed Dec. 21, 2001.

* cited by examiner

*Primary Examiner*—John Follansbee
*Assistant Examiner*—Jinsong Hu
(74) *Attorney, Agent, or Firm*—Law Offices of Albert S. Michalik, PLLC

(57) ABSTRACT

A method and system for transparently combining remote and local storage to provide an extended file system such as a virtual local drive for a computer system client/user, e.g., a user of a pocket sized personal computer or a cable set-top box. A client device may load file system object data, storing the directories and files remotely, and retrieving the files only when required. Via its local storage, the extended file system handles unreliable connections and delays. When a connection to an extended file system server is present, the extended file system provides automatic downloading of information that is not locally cached, and automatically uploading of information that has been modified on the client. Extended file system attributes are employed to determine the actual location of file system data, and a lightweight protocol is defined to download or upload remote data by low-level components that make the remote source transparent from the perspective of the application. The system scales to large networks as it employs the lightweight protocol and establishes a connection only to retrieve and submit data.

11 Claims, 12 Drawing Sheets

EXTENDED FILE SYSTEM

This application claims benefit of Provisional Nos. 60/126,094 filed Mar. 25, 1999 and 60/171,995 filed Dec. 23, 1999.

FIELD OF THE INVENTION

The present invention relates generally to computer devices and networks, and more particularly to file storage and access by a computer-related device.

BACKGROUND OF THE INVENTION

Consumer devices such as Pocket PCs or palm-sized and handheld computers are limited in their available storage space. These devices are capable of loading and executing software packages in much the same way as a desktop computer, but lack the storage necessary to have several of these packages loaded onto the system concurrently along with other data needed by a user. Other devices such as cable television set-top boxes, satellite receivers and so forth have the same lack-of-memory problems.

As access to the Internet via such devices is being planned and to some extent implemented, the lack of storage on the devices create problems not seen in home or business computers. For example, personal site customizations, favorites, saved data such as credit card information, cookies and so forth are typically stored on computing devices having relatively large hard disks wherein storage is not normally an issue. E-mail files, which on a device such as a single set-top box, will differ for (possibly multiple) individual users of that device. However, saving such data along with other needed information would quickly fill up the available storage on many devices, and if, for example, a relatively large file was downloaded to the device, the saved data would have to be discarded in order to fit the large file. Indeed, in at least one contemporary cable television set-top box, only 128 kilobytes are available for persisting user data, which is several orders of magnitude smaller than the hundreds of megabytes to dozens of gigabytes typically provided by contemporary personal computers. Contemporary pocket-size devices have somewhat more memory, but are still on the order of tens megabytes or less, of which the operating system and stored programs consume a considerable amount.

While network shares allow greater amounts of storage to be accessed via remote drive connections, their implementations require constant connection to the network in order to access a network share. Among other drawbacks, this makes network shares unsuitable for use with the Internet. For example, NetBIOS and other drive-sharing (redirector) systems currently require constant communication between the server and the client. Data is not cached, but instead is used directly off the shared file system, and is updated immediately. This is not acceptable for Internet-based file sharing, as the Internet is unreliable, and can be susceptible to long delays in transmission. The NetBios service and SMB protocol are also point-to-point, relatively heavy, and do not scale well to large numbers of remote users and multiple servers. Other existing services are unable and/or impractical to provide a solution to these low memory problems.

SUMMARY OF THE INVENTION

Briefly, the present invention provides a method and system for transparently combining remote and local storage to act as one or more virtual local drives for a computer system client, such as a pocket sized personal computer or a set top box. When a connection to an extended file system server is present, the extended file system provides automatic downloading of information that is not locally cached, and automatically uploading of information that has been modified on the client. Providing such a remote drive allows any client device to load file system objects, storing the directories and files remotely, and retrieving the files only when required. Via its local storage, the extended file system handles unreliable connections and delays, particularly with small files such as cookies, e-mail text and so forth.

To provide the extended file system, the client includes components that determine via object attributes the remote/local location of file system data, and when appropriate, download or upload the data in a manner that is transparent from the perspective of the application. Thus, an application makes normal file/operating system application programming calls or the like, and the client components determine the source and retrieve/update the data appropriately. Data that is updated (e.g., written) locally is automatically synchronized with the remote server.

Moreover, communication is fast by use of a relatively lightweight protocol using straightforward primitives described herein, and may be made secure via authentication and encryption. The system scales to large networks as it employs the lightweight protocol and establishes a connection only to retrieve and submit data.

Other advantages will become apparent from the following detailed description when taken in conjunction with the drawings, in which:

DETAILED DESCRIPTION

Exemplary Operating Environments

Figure 1:
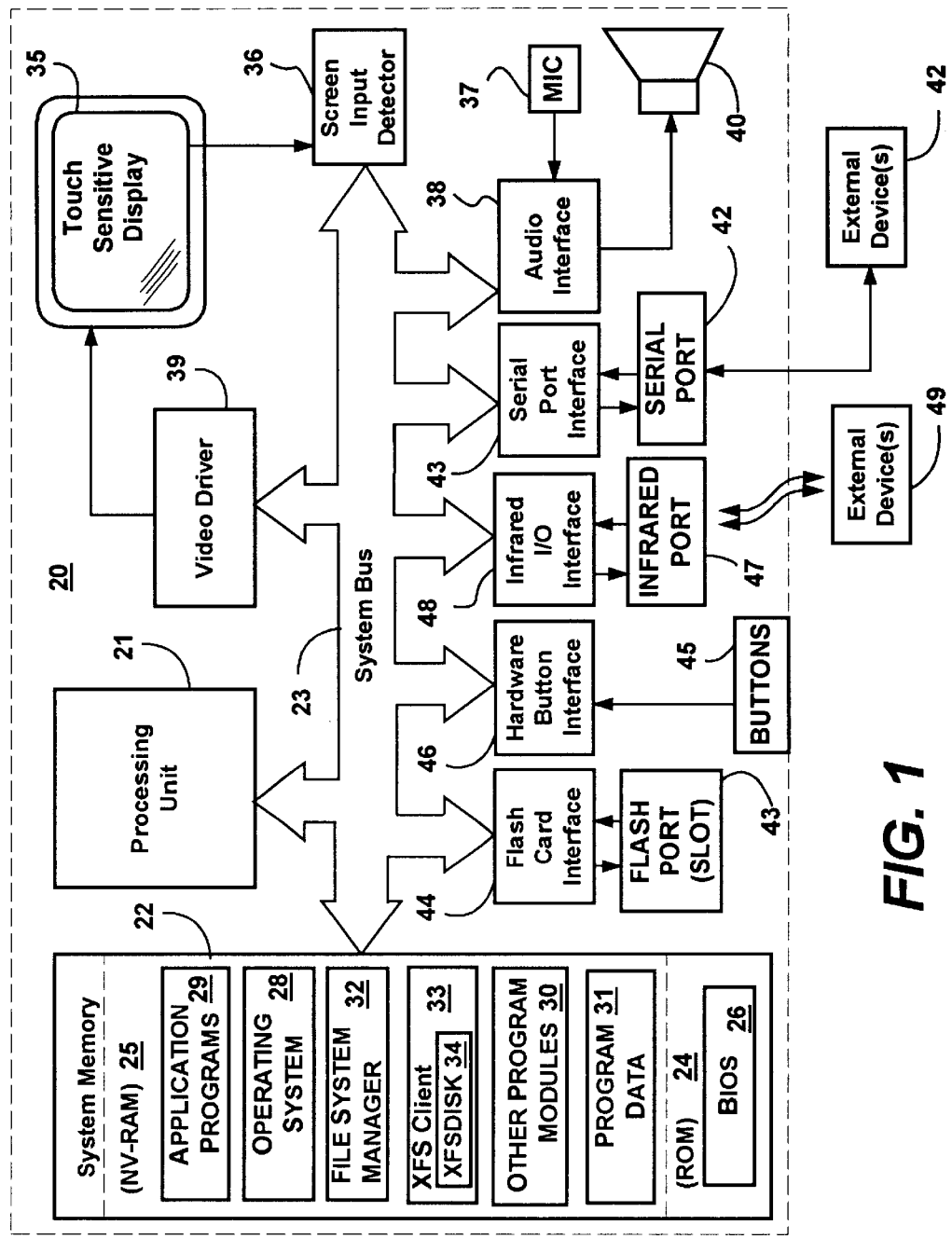
FIG. 1 is a block diagram representing one exemplary computer system into which the present invention may be incorporated.

FIG. 1 and the following discussion are intended to provide a brief, general description of one suitable computing environment in which the invention may be implemented. Although not required, the invention will be described in the general context of computer-executable instructions, such as program modules, in one alternative being executed by a pocket-sized computing device such as a personal desktop assistant. Generally, program modules include routines, programs, objects, components, data structures and the like that perform particular tasks or implement particular abstract data types.

Moreover, those skilled in the art will appreciate that the invention may be practiced with other computer system configurations, including hand-held, laptop or desktop personal computers, mobile devices such as pagers and telephones, multi-processor systems, microprocessor-based or programmable consumer electronics including a cable or satellite set-top box (FIG. 2), network PCs, minicomputers, mainframe computers and the like. Part of the invention is also practiced in distributed computing environments where tasks are performed by remote processing devices that are linked through a communications network. In a distributed computing environment, program modules may be located in both local and remote memory storage devices, as described below.

With reference to FIG. 1, one exemplary system for implementing the invention includes a general purpose computing device in the form of a pocket-sized personal computing device 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25, typically non-volatile RAM (e.g., battery-backed up) in a pocket-sized personal computing device. A basic input/output system 26 (BIOS), containing the basic routines that help to transfer information between elements within the hand-held computer 20, such as during start-up, is stored in the ROM 24.

A number of program modules are stored in the ROM 24 and/or RAM 25, including an operating system 28 (such as Windows® CE), one or more application programs 29, other program modules 30, program data 31 and a file system manager 32.

In accordance with one aspect of the present invention, a local memory is used as part of a virtual local drive is provided by an XFS client component 33, which includes an XFS Ramdisk manager and storage 34 (XFSDISK), and other components (described below). A user may enter commands and information into the hand-held computer 20 through input devices such as a touch-sensitive display screen 35 with suitable input detection circuitry 36. Other input devices may include a microphone 37 connected through a suitable audio interface 38 and physical (hardware) or a logical keyboard (not shown). Additional other devices (not shown), such as LED displays or other peripheral devices controlled by the computer, may be included. The output circuitry of the touch-sensitive display 35 is also connected to the system bus 23 via video driving circuitry 39. In addition to the display 35, the device may include other peripheral output devices, such as at least one speaker 40 and printers (not shown).

Other external input or output devices 42 such as a joystick, game pad, satellite dish, modem or the like (satellite, cable or DSL interface), scanner or the like may be connected to the processing unit 21 through an RS-232 or the like serial port 40 and serial port interface 41 that is coupled to the system bus 23, but may be connected by other interfaces, such as a parallel port, game port or universal serial bus (USB). Such devices may also be internal. The hand-held device 20 may further include or be capable of connecting to a flash card memory (not shown) through an appropriate connection port (e.g., slot) 43 and interface 44. A number of hardware buttons 45 such as switches, buttons (e.g., for switching application) and the like may be further provided to facilitate user operation of the device 20, and are also connected to the system via a suitable interface 46. An infrared port 47 and corresponding interface/driver 48 are provided to facilitate communication with other peripheral devices 49, including other computers, network connection mechanism (e.g., modems or the like), printers, and so on (not shown). It will be appreciated that the various components and connections shown are exemplary and other components and means of establishing communications links may be used.

Figure 2:
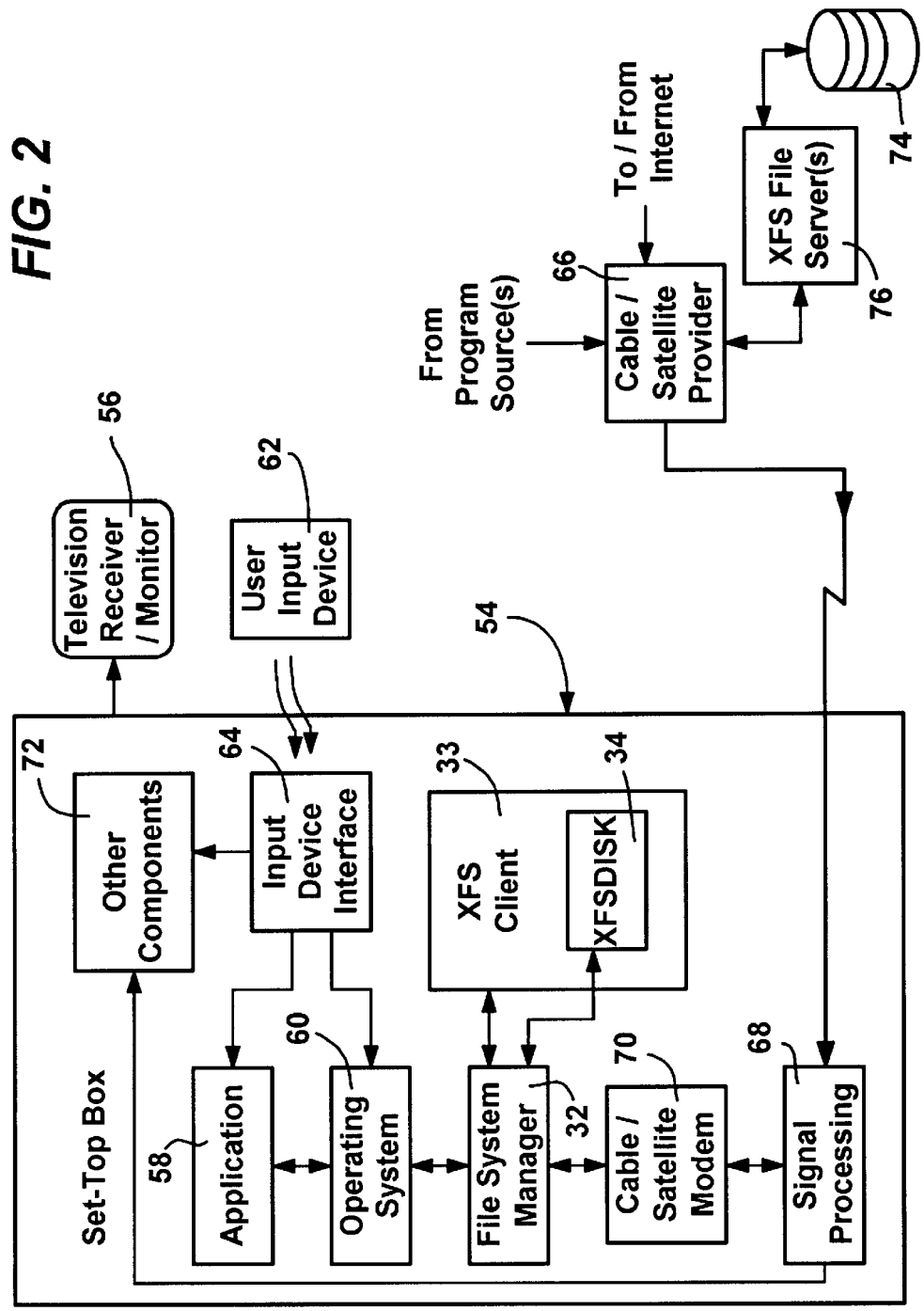
FIG. 2 is a block diagram representing a television set-top box including a computer system into which the present invention may be incorporated.

Turning to FIG. 2 of the drawings, there is shown an alternate computer system into which the present invention may be incorporated, implemented in a set-top box 54 connected to a television receiver/monitor 56. In FIG. 2, an application 58 which may, for example, provide a user interface configured to control set-up, parental control, tuning, timed operation, and/or the like is provided. The application may also provide a user interface via which a user is able to access the Internet, and may include a browser, although as is known, the browser may be integrated into the operating system 60 of the set-top box 54. A user interacts with the application 58 and/or operating system 60 (such as Windows® CE) via a user input device 62 (such as an attached keypad, infrared remote control and/or hard-wired keyboard) and suitable device interface 64.

As is known, one of the functions of a contemporary set-top box 54 is to output to the receiver/monitor 56 television programming and Internet content received from a provider 66. To this end, some signal processing mechanism 68 or the like is generally provided, such as including one or more splitters, filters, multiplexers, demultiplexers, mixers, tuners and so forth as required to output appropriate video to the receiver/monitor 56, and to both output and input Internet-related data via a cable/satellite modem 70. Of course, consumer satellite dishes only receive content, and thus in a satellite system an additional mechanism (e.g., telephone line, not shown) is required to output data to the provider 66. Other components 72 such as to display closed-captioning, allow parental control, provide on-screen program guides, control video recorders and so forth may be provided as is also known. In any event, these functions of set-top boxes are known, and are not described herein for purposes of simplicity, except to the extent that they relate to the extended file system of the present invention.

Extended File System

In accordance with one aspect of the present invention, to provide access to remote client-owned objects (directories and/or files therein) maintained in remote storage 74 by one or more XFS file servers 76, the set-top box includes (e.g., in system memory) an XFS client 33 comprising a number of components (described below) including the XFS Ramdisk manager/virtual local drive 34. A file system manager 32 is also provided, as described below. For example, in the Windows® CE operating system, a suitable file system manager is known as "FSDMGR."

Figure 3:
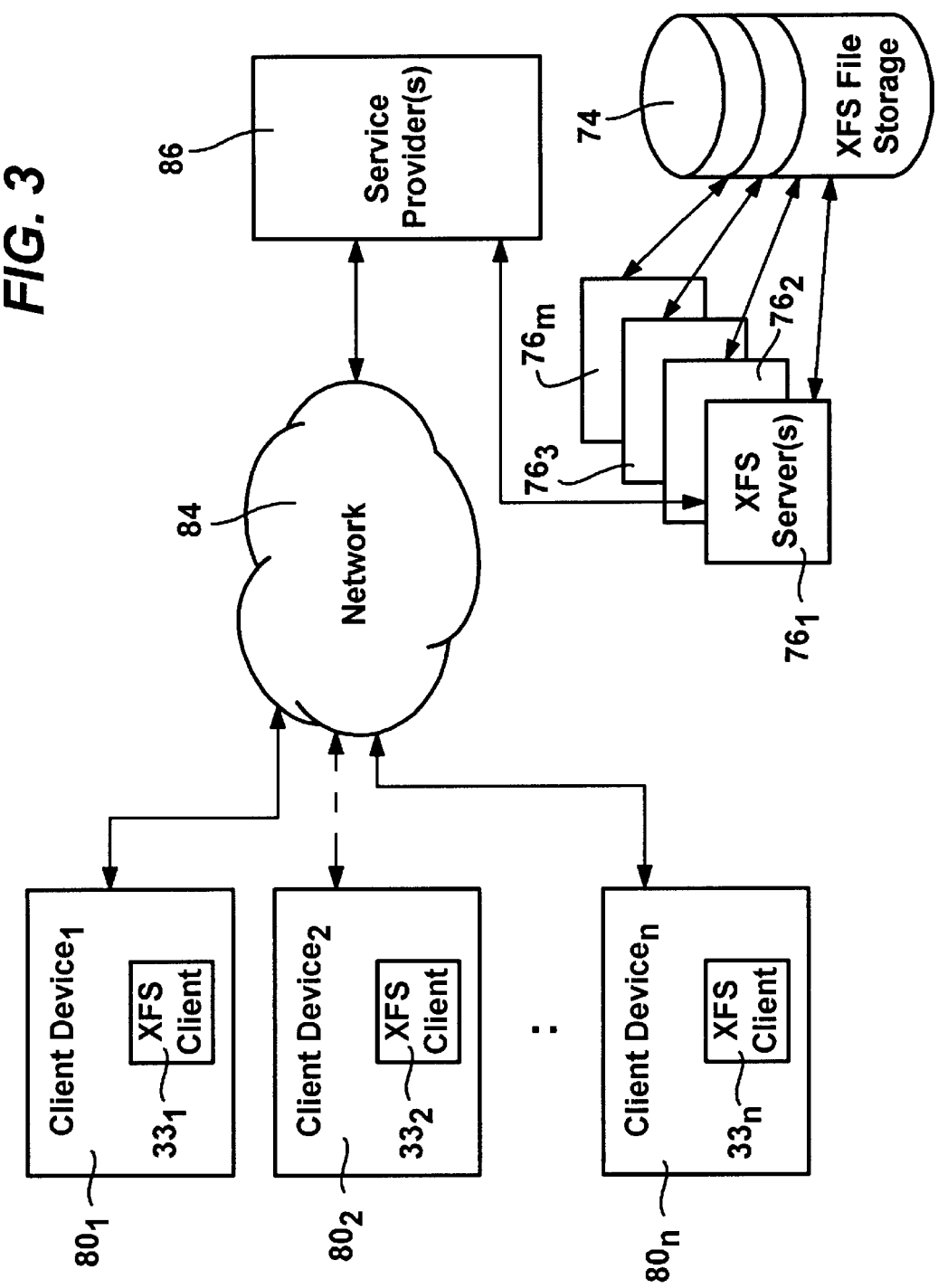
FIG. 3 is a block diagram generally representing an extended file system installation in accordance with one aspect of the present invention.

An exemplary extended file system (XFS) installation is represented in FIG. 3, and typically comprises a large number (e.g., millions) of client devices $80_1$–$80_n$ (for example, the pocket computing device 20 or the set-top box 54). The client devices $80_1$–$80_n$ are capable of connecting to one or more of the servers ($76_1$–$76_m$ in FIG. 3) over a network 84 via a service provider 86. The servers $76_1$–$76_m$ participate in XFS as name servers, access controllers and permission managers, or a combination of access controller, permission manager and name server as described below with reference to FIG. 4.

The servers $76_1$–$76_m$ (more particularly the access controllers) point to a common remote file system for storing files in one or more XFS storage devices 74 implemented using DFS shares. DFS is a feature of Windows® 2000 (or Windows® NT®) that provides file replication (used for providing redundancy of data) and load balancing for a file system. In one preferred implementation, the remote file system is the Windows® NTFS file system, which among other benefits, is considered secure. As will be understood, however, the XFS file system of the client is independent of the remote file system/server configuration, and thus virtually any operating and/or file system (e.g., UNIX, FAT, FAT32) or combination thereof that works with the server-side storage media 74 will suffice for purposes of the present invention.

In the set-top box implementation, the client devices 54 will normally be physically connected to the servers $76_1$–$76_m$ at all times via the cable/satellite modem 70 therein. Indeed, since broadband is in use, remote files may be quickly accessed by the client, as described below, even though logical connections are preferably made on a per-access basis. In keeping with the present invention, however, the client device provides local storage for caching some of the data maintained at the remote storage device 74, thereby enabling operation without a physical connection. Synchronization may be performed at some later time or on demand. As can be appreciated, this is particularly useful with client devices such as pocket-sized computing devices (e.g., 20), digital cameras, and so forth wherein a physical connection is occasional. Moreover, local caching is generally valuable when dealing with Internet content, as even when physically connected to a provider, the Internet is unreliable and can be susceptible to long delays in transmission and also helps in optimizing bandwidth utilization.

Figure 4:
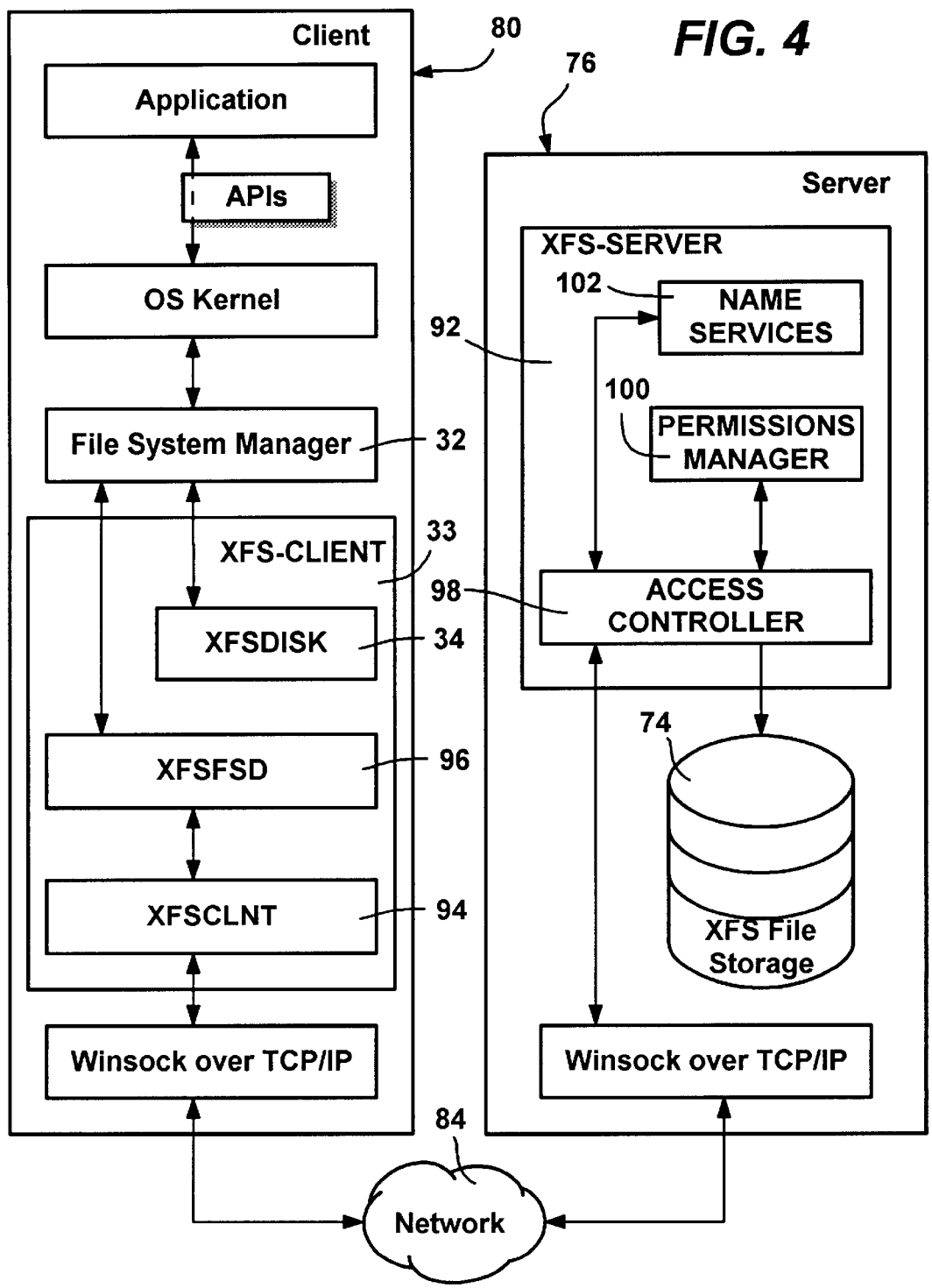
FIG. 4 is a block diagram generally representing logical components in a client and server for remotely accessing objects in accordance with in accordance with one aspect of the present invention.

As generally represented in FIG. 4, the extended file system (XFS) comprises the XFS-Client portion 33 and an XFS-Server portion 92, which together generally include the XFS Ramdisk manager/virtual local drive 34 and other components 94–102 (described below). Note that the various components 94–102 are logical components, and it is likely that several of the components may be integrated into and handled by a single program. For example, the XFS server portion 92 may comprise a single physical component servicing the requests for its logical components. For extremely large installations, however, it may be desirable for the components to be implemented separately for scalability reasons. Similarly, the virtual local drive of XFS (managed by the XFSDISK 34) may be at any physical or virtual location or locations in system memory, not necessarily adjoining or within the memory allocated to the other XFS client components.

The XFSDISK RAMdisk manager 34 that provides the virtual local drive is a complete, thread-safe implementation of a stream interface driver (as defined in the "Windows® CE DDK," available from Microsoft® Corporation, Redmond, Wash.) The XFSDISK 34 is loaded at boot time, and is configured based on information provided in the system registry. The XFSDISK 34 is capable of loading a file system device on itself, thereby appearing as an actual folder off of the root folder of a hierarchically organized file system. To provide accessible memory, the XFSDISK 34 creates a specified number of heaps of a specified size and then "stitches" them together to give the appearance of a single, contiguous, addressable block of memory which serves as a local cache of the virtual local drive. This address space is shared by the threads and processes which access XFSDISK, either through the associated file system device (e.g., the file system manager 32) or by directly reading from or writing to the disk locations. XFSDISK serves as the local cache for the remote file system of the present invention.

Two XFS-Client 33 components include the XFS Client Interface (XFSCLNT) 94 and the XFS File System Driver (XFSFSD) 96. The XFS Client Interface 94 is the interface to the XFS Server 92, and is responsible for translating file system requests into XFS primitives (XFS network functions) and marshaling the primitives across to the server. As will be described below, the XFS Client Interface (XFSCLNT) 94 performs initialization operations.

The XFS File System Driver (XFSFSD) 96 is an installable file system driver, which in one implementation is modeled after the well-documented FAT file system. In keeping with the present invention, a remotely maintained file system is presented as a local file system through XFSFSD 96. As the local disk 33 fills up, the XFSFSD 96 implements a Least Recently Used (LRU) algorithm to make space available. As described below, if it is not possible to make space, the files presented as available in the local file system are marked as remote and for those files, the file system essentially behaves like a redirector. The local cache of files is thus intelligently managed.

The XFS server portion 92 includes an XFS Access Controller 98, an XFS Permissions manager 100, and an XFS Name Resolution Manager (name services module) 102. The access controller 98 is responsible for receiving primitives from the client and taking actions on them, although when the access controller 98 receives name-server primitives, it routes them to name services module 102. As described below, the access controller 98 translates primitives to appropriate actions to be taken on the file system and sends the response back to the client.

The Permissions manager 100 is responsible for authenticating clients and users on the clients. Having authenticated the client, and a specified user, the permissions manager 100 provides access to the private folder for a given client. This is done as a part of PRIMITIVE_CALL, described below. The permissions manager 100 may use the standard X509-based authentication scheme for validating clients. In addition to validating client devices, the permissions manager 100 enables multiple users of a common device (e.g., a single set-top box) to share the same device while isolating the files of one user from each other user. SQL-based authentication, the Windows® 2000 Active Directory that specifies domain users or any custom authentication scheme may be used for authentication.

The name services module 102 provides enlistment and name resolution services, as also described below, by maintaining (e.g., in the local server registry) a local directory of the name servers and access controllers. To enlist, when a server starts up, it sends a UDP broadcast of an enlistment request as described below. If the server gets an appropriate response from one of the other servers, it then sends a directed enlistment for confirming the entries, after which the local directory is synchronized via a directed resolve. The process of sending resolves across to known servers is done at periodic intervals of time to ensure that any server that is added is reflected in the local directory. The name services module 102 also handles defection (withdrawal from participation) of servers. When a defection is initiated for a specific server, the name services module 92 sends directed defects to the other servers in the local directory. Once the other servers have acknowledged the deletion of the defecting server, no more requests are processed.

For the purpose of XFS communications, there are three specific sets of network functions, called primitives, comprising a set of Name Resolution primitives, which include UDP/TCP packets used to locate XFS components on the network, a set of control primitives, which are UDP/TCP packets used for management of the XFS system, and a set of session primitives, which are TCP streams used to transfer data among XFS components. Session primitives are conducted on TCP connections from machine to machine. TCP provides a minimal Quality of Service (QoS) scenario for the connection. Primitives have two distinct states, request and response. Thus, for example, the response to a Resolve request will be a Resolve response. The Maximum size for a primitive is 512 bytes for UDP transported primitives and 1024 bytes for TCP transported primitives.

One control primitive is the enlist primitive, which is used to enlist clients (as described below), and also by servers that are attempting to participate in an XFS installation. A field in the primitive identifies whether a client or server sent the Enlist request.

More particularly, to enlist a server, an XFS server (e.g., $76_3$) sends an Enlist primitive to notify the name servers (XFS-NS) that it wants to begin participation in the XFS system. The server $76_3$ does not begin processing requests until it has received an Enlist response primitive from the name services module at least one other server. After receiving an Enlist response primitive, the XFS server 763 may begin processing requests, however, it should continue to send Enlist primitives until it has received and Enlist response primitive from every name services module 102 server participating on the system. Servers (as well as clients) should maintain lists of resolved server IP's, and preferably update the list in a Time To Live (TTL, which denotes the amount of time that a piece of data may be considered valid before it must be verified), manner. It is recommended that TTL's be no less than 256 seconds for each XFS-NS, and 128 seconds for other servers. In the event that no XFS-NS can be located to resolve requests, the list should be invalidated, and an Enlist primitive should be sent via UDP broadcast to retrieve the network topography.

After the first Enlist response, the name services module of the server $76_3$ should send its Enlist requests to unresponsive XFS-NS servers directly, instead of broadcasting the requests on the network. This will help to reduce network traffic and avoid responses from XFS-NS servers which have already responded to the earlier Enlist request.

Figure 5:
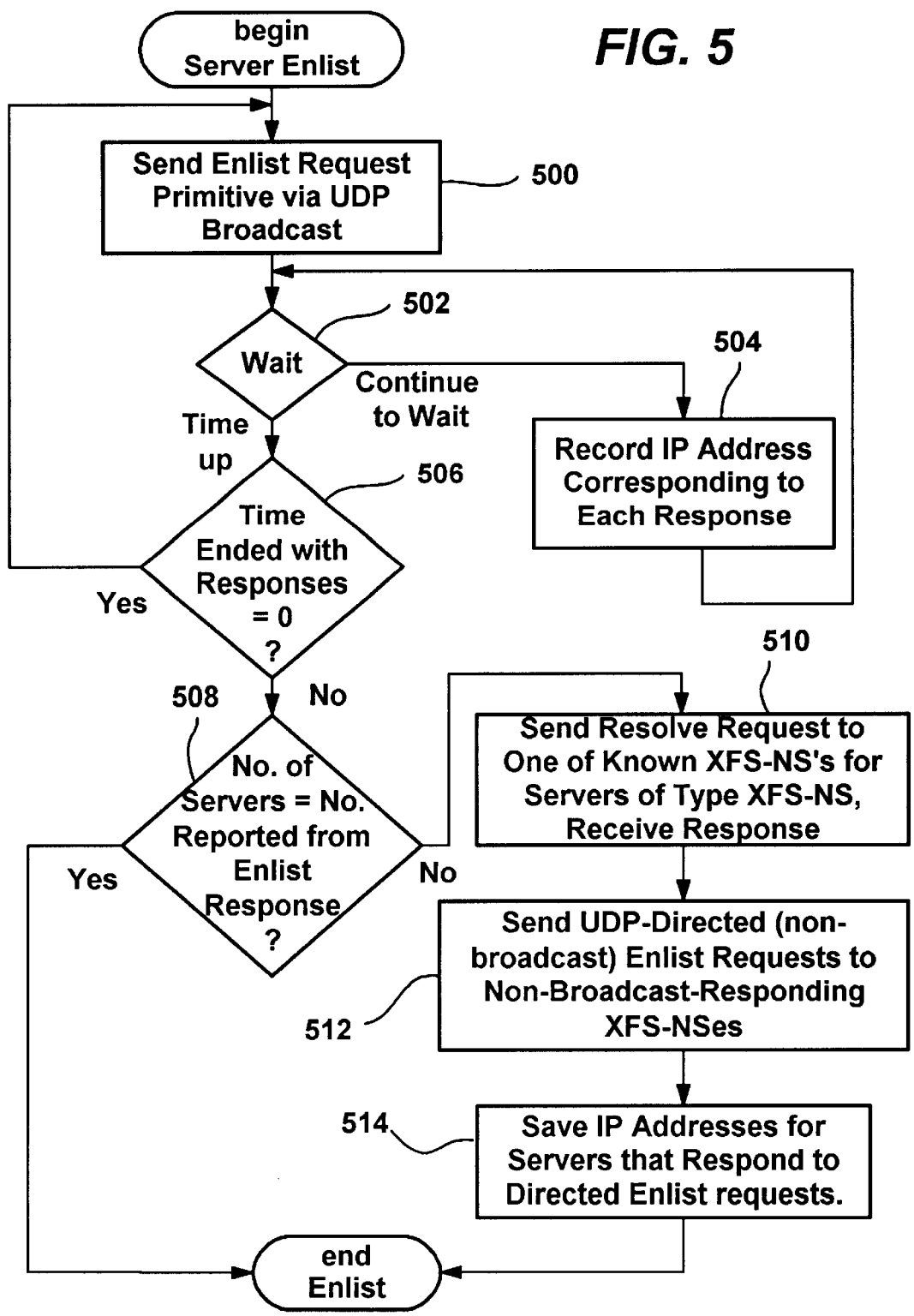
FIG. 5 is a flow diagram generally representing logical steps when enlisting a server to participate in an extended file system in accordance with one aspect of the present invention.

For the server control primitive "Enlist," the logical flow generally described with reference to FIG. 5 should be used to minimize network traffic. As represented in FIG. 5, beginning at step 500, a server sends the enlist request primitive via a UDP Broadcast. This is necessary because the server has no idea as to the locations of XFS-NS's on the network. The server then provides some time duration for responses, as generally represented via steps 502. For each response received, (if any), at step 504 the server records the IP address of the responding server.

In general, UDP transported primitives expect a UDP response verifying their transmission; if no UPD response is received within a reasonable amount of time, the primitive send is considered to have failed, and should be re-issued some number of times before considering the primitive to have failed completely. Thus, when the time for waiting is over, step 506 tests if no responses were received, and if not, branches back to step 500 to reissue the enlist request primitive via UDP Broadcast. If at least one response was received, step 506 branches to step 508 to determine whether the number of servers that responded is the same as the number of XFS-NS servers reported from the enlist responses (note that the number that responded may be less than or equal than reported, but absent some error will not be greater than the number reported). If the numbers match, the enlistment process ends via step 508. If the number responding is less than the reported number, step 508 branches to step 510 wherein a resolve request for servers of type XFS-NS is sent to one of the at least one known XFS-NS. When the response is received, step 512 sends a UDP directed (i.e., non-broadcast) enlist request to each XFS-NS which did not respond to broadcast request. Step 514 saves the IP addresses for servers that respond to the enlist requests. Note that some wait time (not represented in FIG. 5) to obtain the responses may be provided between steps 510 and 512, and between steps 512 and 514. Note that as long as at least one XFS-NS has responded, the server should begin processing requests, except in the case that the enlisting server is a XFS-NS. The server is to complete enlistment with the other XFS-NS's, and system implementers should strive to ensure that enlistment will be completed even in the case of server and/or network outages.

To withdraw from participation, an XFS server (e.g., $76_2$) sends a Defect primitive to notify the XFS-NS that is no longer wishes to participate in the XFS system. Note that defection is not intended for temporary removal of the server from the XFS system, but rather is used to remove a server from the XFS for extended or indefinite periods. As described below, the name resolution primitive "Locate" will be used to determine server availability. Further, note that the server may quit responding to XFS name resolution and session primitives at this time, but is not to shut down until a Defect response primitive is received from each of the known XFS-NS's in the system.

Figure 6:
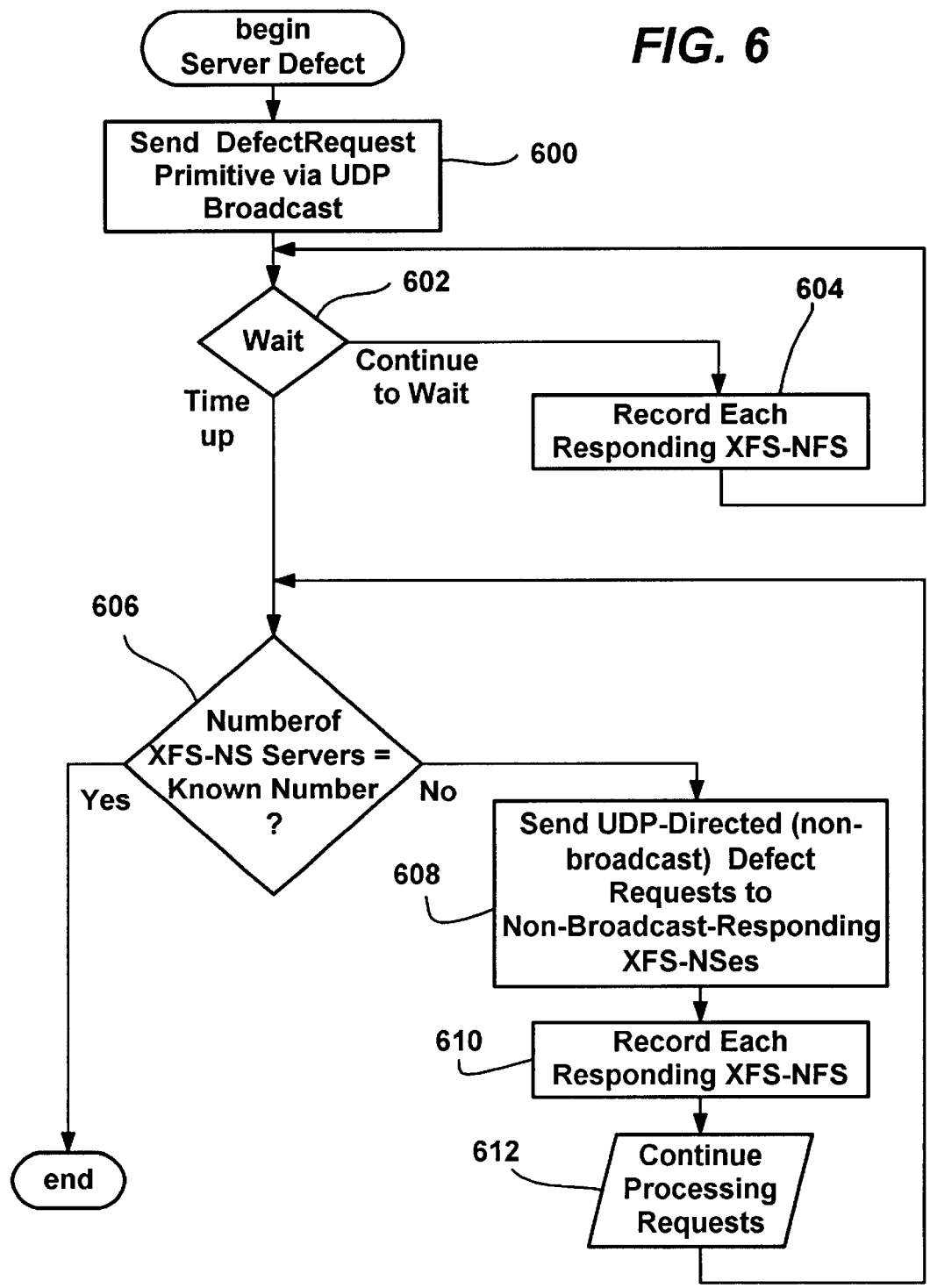
FIG. 6 is a flow diagram generally representing logical steps when defecting a server from participation in an extended file system in accordance with one aspect of the present invention.

For the server control primitive "Defect," the logical flow generally described in FIG. 6 should be used to minimize network traffic. In FIG. 6, beginning at step 600, a server sends the Defect request primitive via a UDP Broadcast. After some time, (step 602), the server normally receives a number of Defect responses from the XFS-NS servers (step 604).

At step 606, If the numbers match, the enlistment process ends. Otherwise, (i.e., the number is less than the total number of known XFS-NS servers), step 606 branches to step 608 to send a UDP-directed (non-broadcast) Defect request to each XFS-NS which did not respond to the broadcast request, and then record the IP address of each responding XFS-NFS at step 610. Note that until all known XFS-NS have responded, the server should continue processing requests (step 612), i.e., the server is to complete defection with each XFS-NS. System implementers are to ensure that the defection will be completed, even in the case of server and/or network outages.

Figure 7:
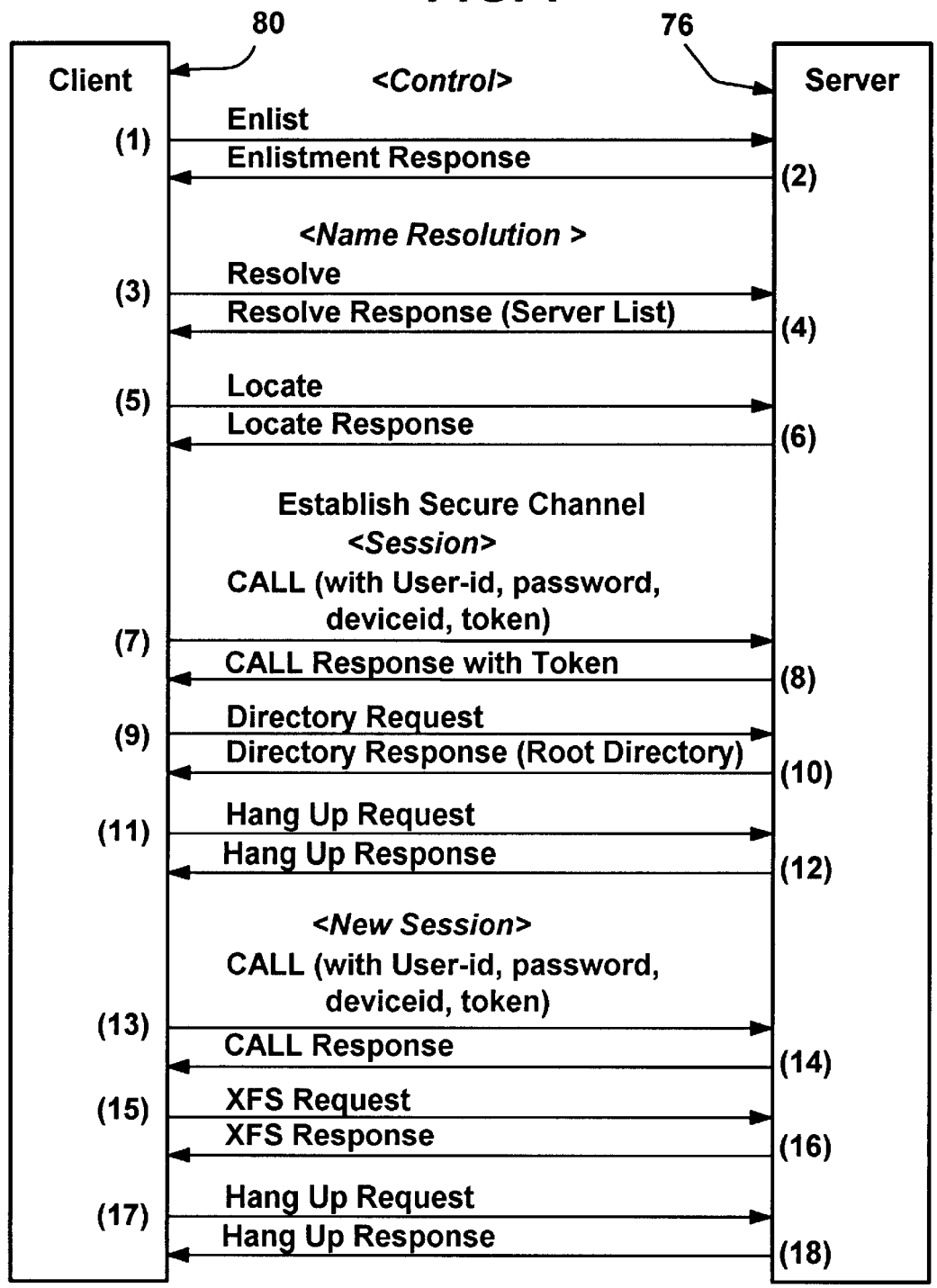
FIG. 7 is a representation of communications between a client device and a server to initiate access to remote objects and perform file system-related operations thereto in accordance with one aspect of the present invention.

Turning to an explanation of the flow of information between one client 80 and one server 76, FIG. 7 shows (via numerically labeled arrows) how and in which direction communication generally takes place. In FIG. 7, it is assumed that the server with which the client 80 is communicating has already enlisted, as described above.

As generally represented in FIG. 7 the client sends an enlist request primitive via UDP Broadcast, as represented by the arrow (1), although as can be appreciated, this primitive likely reaches other servers, not shown. This is performed because the client 80 has no idea as to the locations of XFS-NS's on the network. The client receives a number of Enlist responses from XFS-NSes, such as an XFS-NS name service module of the server 76 (arrow (2)). The client 80 records the IP address of each server from which an appropriate response was received. In addition to enlistment, any other custom method can be used to identify the XFS server to the client. In this case, client enlistment process can be bypassed.

Figure 8:
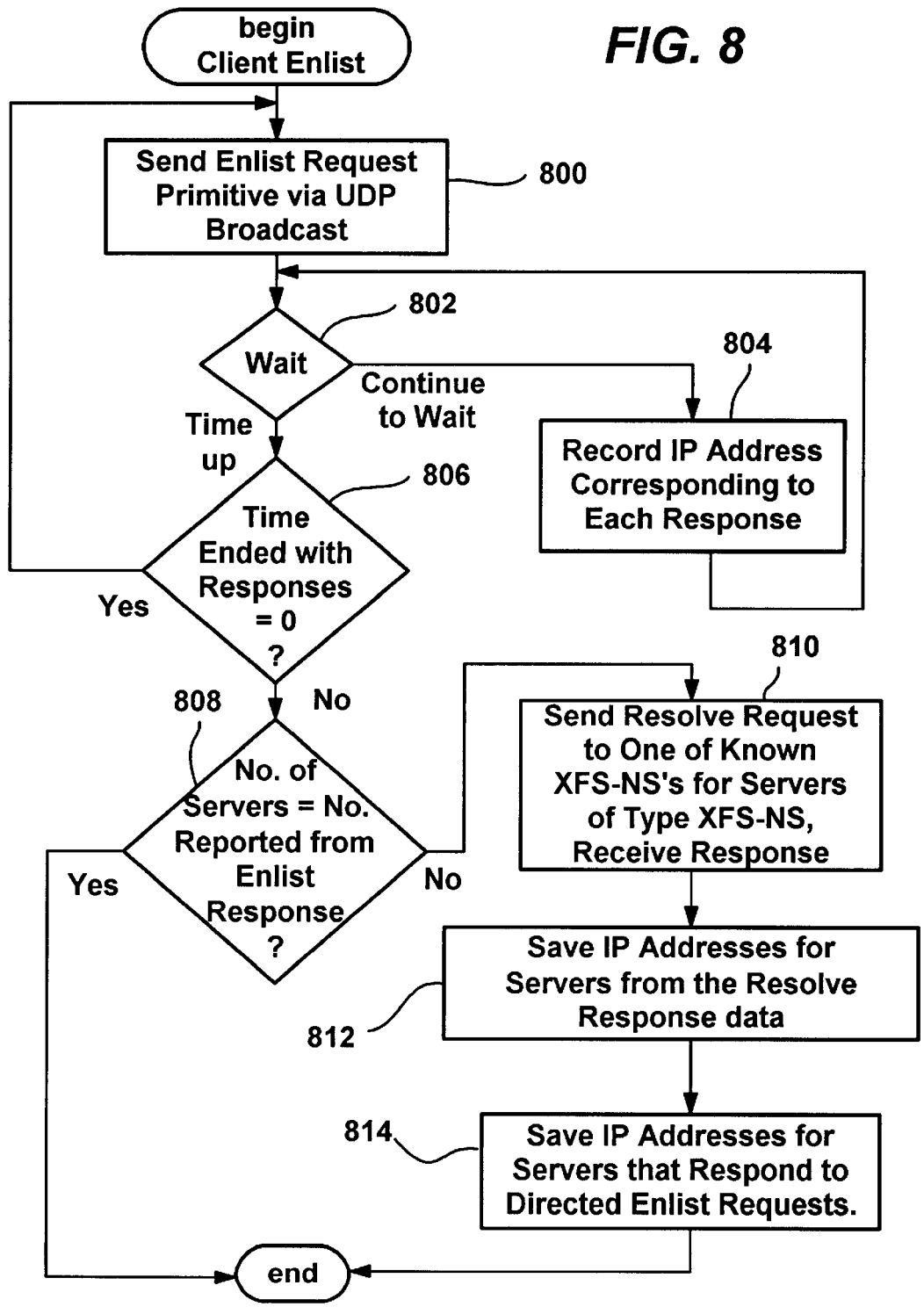
FIG. 8 is a flow diagram generally representing logical steps when enlisting a client to participate in an extended file system in accordance with one aspect of the present invention.

FIG. 8 generally represents the logical flow for client enlistments, (similar in a number of steps to the server enlisted described above with respect to FIG. 5). For the client control primitive "Enlist," as represented in FIG. 8, beginning at step 800, a client 80 sends the enlist request primitive via a UDP Broadcast. The client 80 then provides some time duration for responses, as generally represented via steps 802. For each response received, (if any), at step 504 the client 80 records the IP address of the responding client 80. When the wait time is up, step 806 tests if no responses were received, and if not, branches back to step 800 to reissue the enlist request primitive via UDP Broadcast, at least for some number of reissue attempts. Alternatively, if at least one response is received, step 806 branches to step 808 to determine whether the number of servers that responded is the same as the number of XFS-NS servers reported from the enlist responses (note that the number that responded may be less than or equal than reported, but absent some error will not be greater than the number reported). If the numbers match, the client has located the full set of servers, and the enlistment process ends via step 808. Note that the XFS-NS will not remember the enlistment of XFS clients. The client enlistment scenario is only for network topography discovery. Thus, the XFS clients have no need to defect from the system, though it is not considered an error for a client to do so.

If at step 808 the number responding does not equal (i.e., is less than) the reported number, step 808 branches to step 810 wherein a resolve primitive (arrow (3) in FIG. 7) is sent to an XFS-NS (one of the at least one known) to request a list of IP addresses of the specified XFS server type participating on the system.

Returning to FIG. 7, when the Resolve response is received (arrow (4) in FIG. 7), the client saves the IP addresses for servers from the ResolveResponse data at step 812. The client 80 may select one of the resolved servers (e.g., the server 76) via a random process or the like so that the total load of a set of clients is randomly distributed across multiple servers. A client Locate primitive is then sent by the XFS client 80 to the selected XFS server 76 in order to verify the existence of that server on the network (arrow (5) in FIG. 7), and if it exists, the server responds (arrow (6)).

Figure 9:
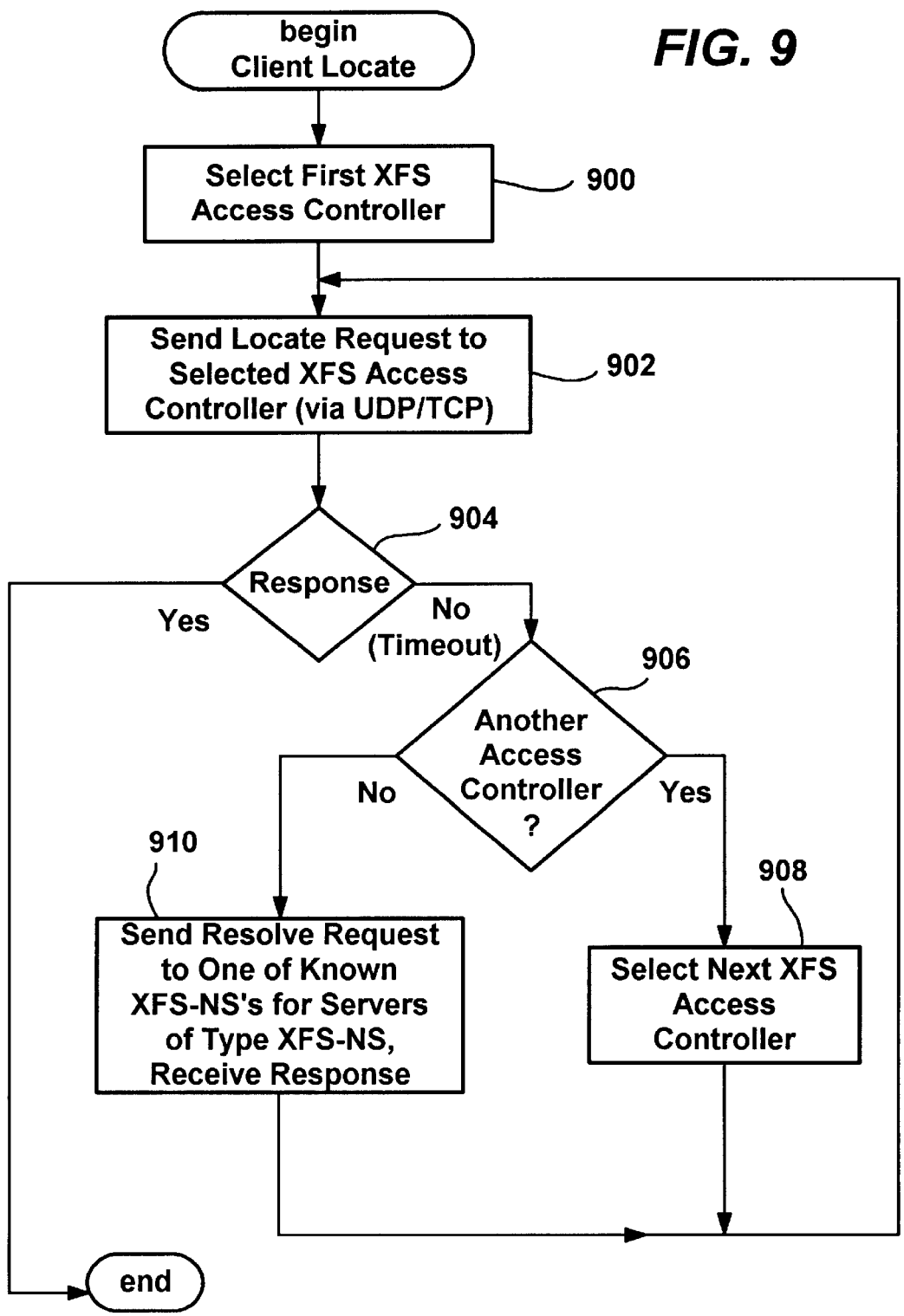
FIG. 9 is a flow diagram generally representing logical steps when a client attempts to locate a selected server for accessing an extended file system in accordance with one aspect of the present invention.

More particularly, prior to establishing a TCP session, an XFS client should perform the logical flow represented in the steps of FIG. 9 described below. At step 900 of FIG. 9, the client selects a first XFS access controller, (e.g., from a randomly-ordered list), and at step 902 sends a Locate request to the selected XFS access controller via UDP/TCP. If at step 904 there is no response, (e.g., within a suitable delay), and if at least one other access controller is listed, (step 906), the client selects the next XFS access controller at step 908 and returns to step 902 to repeat the process.

If at step 904 there are no more XFS access controllers in the XFS client's list of servers, the client sends a Resolve request at step 910 to a known XFS-NS to update the list, and after receiving a response, returns to step 902 for at least some number of retry attempts. In the event that no XFS-NS can be located to respond to the resolve request, (not represented in FIG. 9), the list should be invalidated, and an Enlist primitive should be sent (as described above) via a UDP broadcast to retrieve the network topography.

Thus, to summarize, at startup time, the XFS Client Interface (XFSCLNT) 94 of a client 80 sends a client enlistment broadcast on UDP to get the network topology of the servers. Once the enlistment response is received, a directed resolve is sent to the server that responded to enlistment to get a list of access controllers and name servers. Once the client receives a list of name servers and access controllers, the initialization is complete and other primitives can be sent. The other primitives are wrapped in PRIMITIVE_CALL and PRIMITIVE_HANGUP, described below.

The session primitives include a call primitive, which initiates a session with a server that is listening. Authentication will be performed during the call, which may include several round trips on the network. For example, the first client call request primitive may include a device id, user-id, user password and a "ticket" (arrow (7) in FIG. 7). The ticket may not be present if it is the first CALL, for instance after power up. The server retrieves credentials from the CALL primitive. If the ticket is not present, server makes a call into the permissions manager to verify the credentials. If the credentials are not valid, the session is dropped. If the credentials are valid, the server constructs a ticket, which consist of expiration time, box id, user id, and a password, encrypts the ticket and sends it back to the client. In the case when ticket is present in the CALL primitive, the server decrypts the ticket and makes sure that the expiration time is greater then the current time and that the box id, user id and password in the decrypted ticket match the credentials passed. If everything is valid, the same ticket is passed back to the client (e.g., arrow (8) in FIG. 7). Otherwise the credentials are checked against the permissions manager, and if they are valid, a new ticket is generated and passed back to the client. The client caches the ticket and uses it the future when sending CALL primitive. The ticket in the described scheme serves as a scalability component, which greatly reduces hits to the authentication mechanism. In order to further decrease hits, the expiration period is set to random value between predefined minimum and maximum values (typically between 3–8 hours).

Additionally, the underlying channel is secured using the standard PKI infrastructure. When a client makes a TCP connection to the server, the client sends over "Establish secure channel" message. Then, the client sends over its certificate containing its public signature key. The server validates the certificate as for trust, and if it finds the certificate is not valid, disconnects. The server then sends back over a block of random data. The client computes an MD5 hash of the block of random data, signs the MD5 hash using the client's private signature key, and then sends the signature to the server. The server computes a MD5 hash of a block of the same random data. The server validates the signature passed over by the client using the public signature key buried in the client's certificate. If the validation fails, the client is considered an imposter, and the server disconnects. The server encrypts its two secret RC4 keys with the client's public key exchange key and sends over encrypted RC4 keys—SEND key first and then RECEIVE key. The client decrypts the RC4 keys using its private key exchange key. The client stores the first RC4 key as its RECEIVE key and the second as its SEND key (i.e., opposite of the server). The channel is now secure. Any data to pass through secure connection must be encrypted with the SEND key on the client and then decrypted using the RECEIVE key on the server. The same two keys are shared between all clients connecting to a given server. There is a provision that the server may expire it's RC4 keys at any time, forcing the client to re-negotiate a new set of RC4 keys. This rotation of keys helps the channel from being compromised.

Once the server authenticates the client and vice-versa, the virtual file system of the present invention is made available to the client. Although not necessary, an automatic directory request (arrow (9) in FIG. 7) is sent on behalf of the client to retrieve the first level of directories (arrow (10)) under the root. One public folder is provided to supply clients with common information, (e.g., an updated component), and each client has a subdirectory at the sever with a unique name. It is this subdirectory that essentially serves as the root for the each client. The client then ends the call via a hangup request (arrow (11)) and response (arrow (12)).

Figure 10:
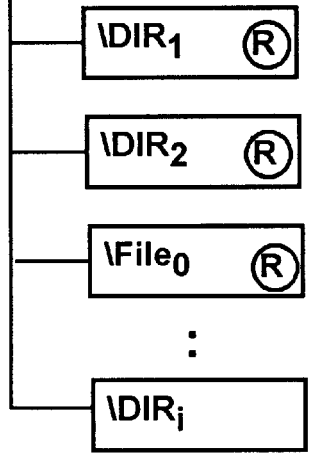
FIGS. 10–12 are representations of how the client components access local objects locally and remote objects remotely in accordance with one aspect of the present invention.
Figure 11:
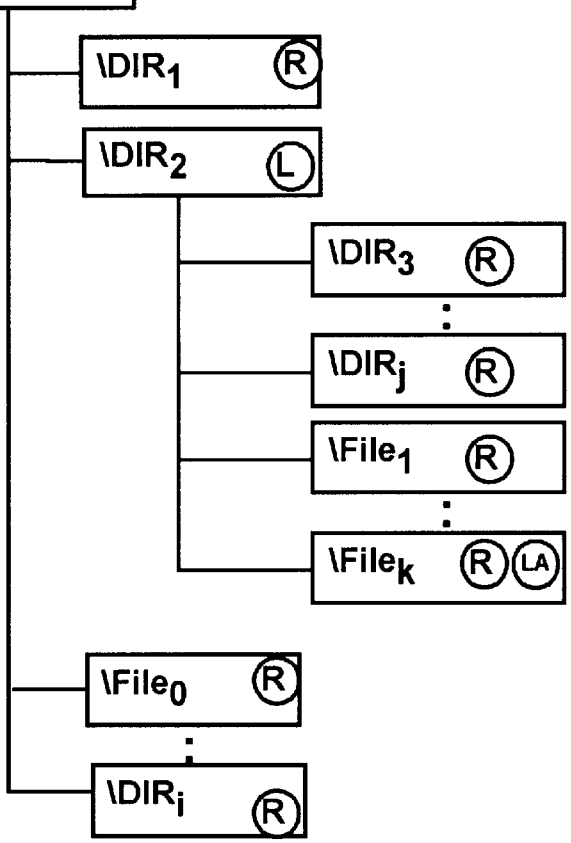
Figure 12:
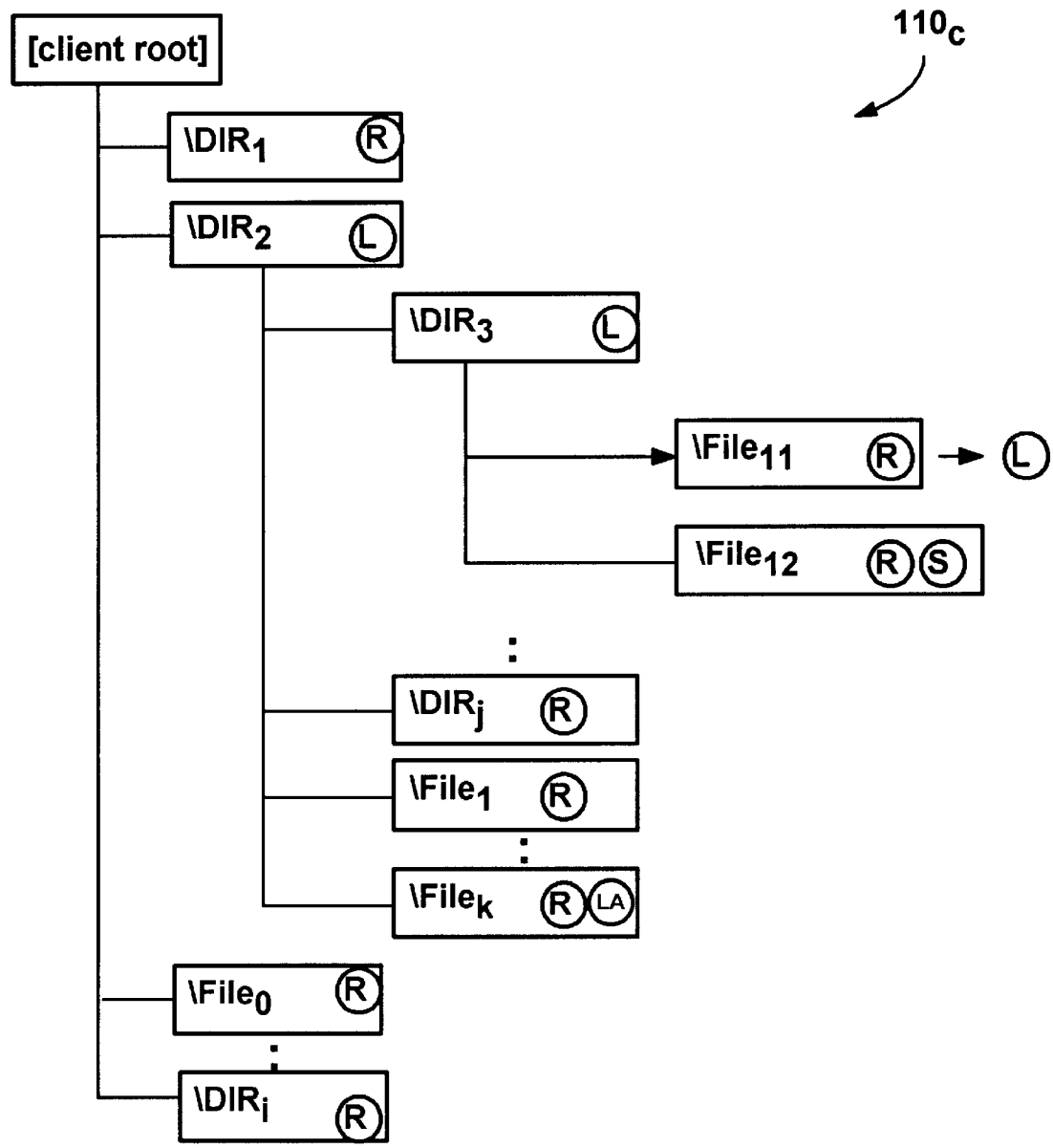

As shown in FIG. 10, the retrieved directory has whatever subdirectories and files (objects) under it that the user of the client device has stored therefore under the first level. The XFS file system adds an attribute (flag) to each object indicating whether the file or directory data stream is in the local storage, or is remote. As represented in FIGS. 10–12, this is indicated by a circled "R" for remote or "L" for local. As can be understood from FIG. 10, at this time, each directory and file are remote.

The user can request typical file system operations on objects via session primitives in a new session, (represented in FIG. 7 by arrows numbered (13–18)). As shown in FIG. 7, these XFS-related session primitives (arrows (15) and (16)) are generally wrapped in PRIMITIVE_CALL (arrows (13) and (14)) and PRIMITIVE_HANGUP (arrows (17) and (18)) primitives, and are set forth in the table below:

| | |
|---|---|
| Send | Send data. A time-out can occur. The send primitive may be "chained", that is, the sender will send multiple sends. |
| Retrieve | Retrieve data. A time-out can occur. The retrieve primitive may be "chained", that is, the server could send multiple retrieve responses to the client. |
| Directory | Retrieves a listing of files and directories under the current working directory for the current session. |
| ChangeDir | Changes the current working directory for the current session. |
| CreateDir | Creates a new directory. |
| CreateFile | Creates or opens a file and returns a fileID. |
| RemoveDir | Removes an existing empty directory. |
| DelFile | Deletes an existing file from the object store. |
| CloseFile | Closes the file opened or created by CreateFile primitive. |
| MoveFile | Renames an existing file or a directory-including all its children. |
| GetFileAttr | Fetches attributes for a specified file or directory. |
| SetFileAttr | Sets a file attribute. |

-continued

| | |
|---|---|
| GetFileSize | Gets the file size. |
| SetEOF | Sets a End Of File marker at the current location of the file. |

As described above, the Call and Hangup primitives are used so that the system can scale to large networks, i.e., XFS establishes a connection only to retrieve and submit data, and then closes (hangs up) the connection.

Thus, unlike existing file systems, when the user requests a file system operation on an object, the extended file system of the present invention evaluates the Local/Remote attribute to determine whether the object can be retrieved locally or needs to be retrieved from remote storage. Any changes to a local object are synchronized with the remote file system, however reads and the like that do not change an object may be performed locally, without any need to communicate with the server. Note that as described below, some files are too large to be stored locally, and such files are marked by setting another attribute, i.e., a "synchronize only" attribute (circled "S" as represented in FIG. 12).

By way of example, consider a user presented with the locally-downloaded directory listing 110a when the user (or some entity such as a remote server) wants to access (e.g., open) a particular file, e.g., via the path \$\backslash DIR_2 \backslash DIR_3 \backslash File_{11}$. When the user selects the $DIR_2$ directory, or when the path\filename is provided, the system determines from the Local/Remote file attribute that the directory \$\backslash DIR_2$ is remote. For example, in a Windows® CE environment, an application places an API call to the operating system kernel, which passes the request to the file system manager 32 (FIG. 4). In turn, the file system manager 32 (e.g., FSDMGR in Windows® CE) sends the request to the XFSFSD 96, which analyzes the call and calls back to the file system manager 32 with the information (track and sector) needed to locate the attribute information on the XFSDISK 34. Note that the track equals one on a RAMDisk. When the file system manager returns the attribute information, the XFSFSD 96 determines that the directory data stream is remote, and calls the XFSCLNT 94 to retrieve the data from the remote server. XFSCLNT issues a DIRECTORY primitive to the server and fetches the remote data. As can be readily appreciated, other operating system and/or file systems may perform essentially equivalent operations, and there is no intent to limit the present invention to the Windows® CE operating system.

When the requested data returns, the XFSCLNT 94 provides it to the XFSFXD 96, which stores it in the XFSDISK 34. At this time, the information is generally arranged as shown in listing $110_b$ of FIG. 11, i.e., $DIR_2$ is local, and the objects under it remote. The process continues as above to remotely retrieve the $DIR_3$ subdirectory data (listing $110_c$ of FIG. 12), and then again to remotely retrieve the data of $File_{11}$. The next time that access to $File_{11}$ is needed, DIR2 and DIR3 may still be local, in which event the data may be locally retrieved from XFSDISK 34, i.e., once data is local, the extended file system essentially behaves in the same manner as any local file system.

Note that from the perspective of the application and user, there is no knowledge as to where the objects are stored. Indeed, with fast, broadband connections and small files, any delay in retrieval may go unnoticed. Unlike a simple redirector, however, the locally stored information is used whenever the information is present locally.

Similarly, on the server end, the access controller may perform normal access checks and the like, and if appropriate to return/update the server-maintained data, translates the primitive into whatever command corresponds based on the remote file system in use, (e.g., the access controller an API call that equates to the primitive).

One of the files in FIG. 12, namely $FILE_{12}$, is shown as having its synchronize-always ("S") attribute set. Note that the other files (and also directories) have this attribute, but it is only shown in FIGS. 10–12 for the file ($FILE_{12}$) where it is active. This attribute is used for files that are too large for local memory; their information is always retrieved from the remote storage, providing the user with as much data as possible at a given time given available memory, but without maintaining the file in the local XFSDISK 34. In other words, the extended file system operates as a redirector for such objects. Some threshold size (e.g., less than the available RAMDisk size) may be used to determine when a file is synchronize-always. Note that it is also feasible to cache partial files in the XFSDISK 34, and provide the application with an appropriate window to the data, however this is not presently implemented. For example, one present implementation uses a file object as the unit of remote or local storage, however it is equivalent to use something smaller or larger than a single object, e.g., resolution may be to a sector, part of a stream (useful for streaming audio or video) and so forth. As used herein, "object data" such as local or remote object data, includes any size, fixed or variable into which the data may be divided or combined.

Similarly, objects may have a "local-always" attribute set therefor, i.e., if an object is not too large, (e.g., over a certain threshold which may be up to the entire size of the local RAMDisk), the object may be marked so as to not remove it from the cache via the least-recently-used algorithm or otherwise. The local-always "LA" attribute is present for each file, but is only shown in FIGS. 11 and 12 for one file, file $\backslash DIR_2\backslash File_k$. This may be valuable, for example, to save a particular directory stream, or to save file data that is often needed and should not be removed, e.g., if a user reads some large file. Note that if a file is marked as local always, its parent directory or directories may be marked local-always so that it can be accessed even when no connection is present.

Figure 13:
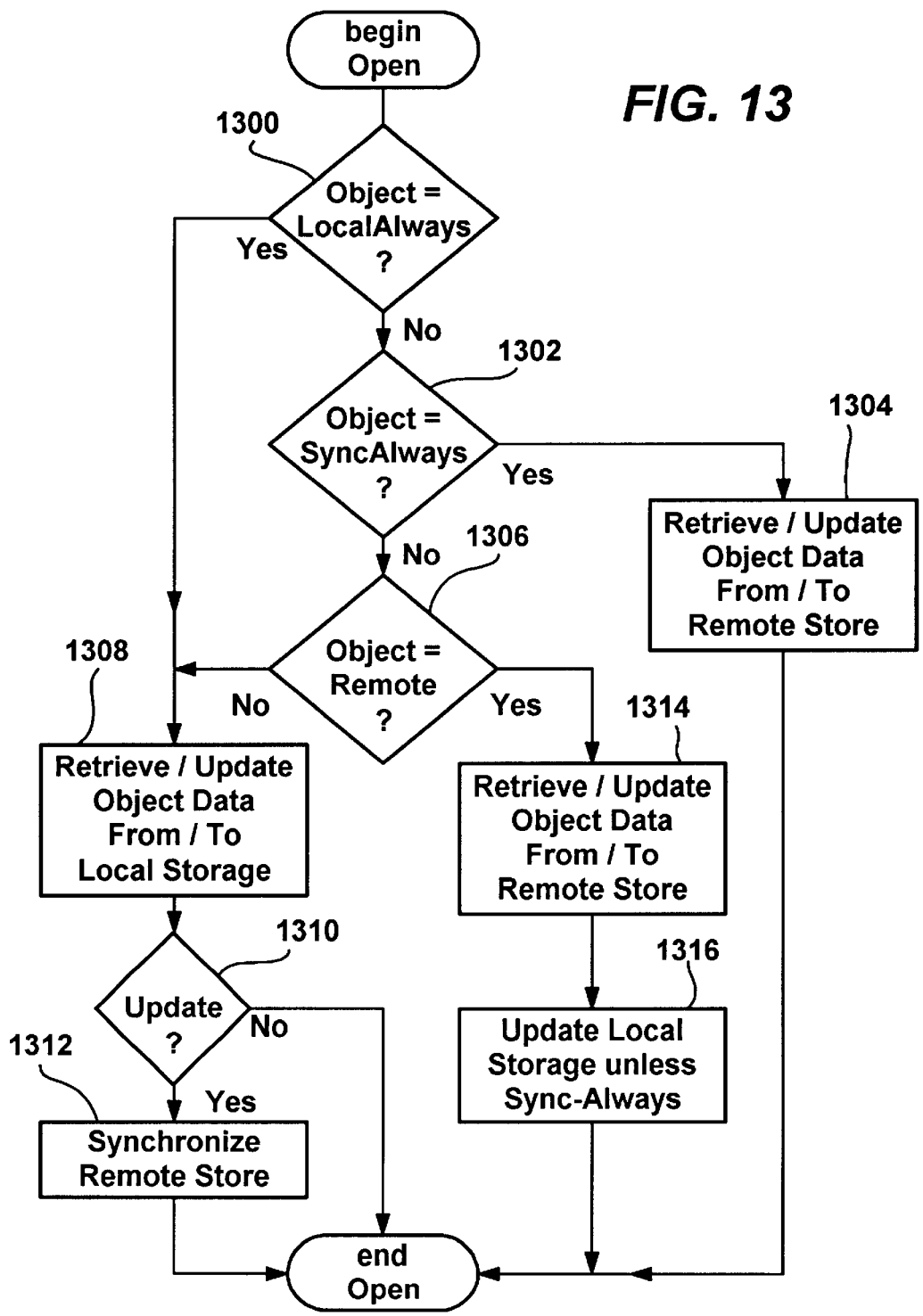
FIGS. 13 is a flow diagram generally representing logical steps when determining the source of an object in accordance with one aspect of the present invention.

To summarize, FIG. 13 shows the general logic performed by the extended file system when retrieving (e.g., reading) or updating (e.g., writing) data, beginning at step 1300. At step 1300, the local-always attribute corresponding to the requested object is evaluated. If set to local-always, then the object will be cached locally, and thus step 1300 branches to step 1308 to retrieve (or update) the data from (or to) the local RAMDisk as described above.

If not local-always at step 1300, the synchronize-always attribute corresponding to the requested object is evaluated at step 1302. If set to synchronize-always, then the object will not be cached locally, and thus step 1302 branches to step 1304 to retrieve (or update) the data from (or to) the remote source using appropriate primitives as described above.

If instead at step 1302 the synchronize-always attribute is not set for synchronize-always, the extended file system evaluates the Local/Remote attribute at step 1306 to see if the information to be retrieved or updated is local. If local, step 1308 is performed to retrieve or update the local data. Steps 1310 and 1312 handle the synchronization of the remote data for updates (e.g., writes) to the local data. Note that it is possible that an update to the local data may result in the file becoming too big for local storage by the XFSDISK. In such an event, the object is set to synchronize-always, and is no longer supported locally unless its data later shrinks. Thus, as used herein, "always synchronize, synchronize-always, always local, local-always and the like" are not necessarily attributes that are permanent, and instead, can vary as appropriate based on the file size, available storage, and/or other factors.

Returning to step 1306, if the Local/Remote attribute indicates that the data is remote, the process instead branches to step 1314 to handle the operation remotely, i.e., to retrieve or update the object data from or to the remote store. Step 1316 then stores the data locally, unless it is too large for the local storage, in which event the synchronize-always bit is set (if not already set) and the data handled remotely thereafter unless and until it shrinks.

Primitive Formats and C Structures

The information below is a description of the packet formats used in the transmission protocols, and their corresponding C/C++ structures. Each packet comprises a primitive header followed by the data of the primitive. Format of the data section depends on the type of primitive. The maximum size for a single primitive (header and data) is 512 bytes.

A plurality of data types are used in the transmission of data, including those set forth below:

| | |
|---|---|
| unsigned char | an 8-bit unsigned integer in the range of 0–255. The bits are arranged in most significant bit first. |
| DWORD | a 32-bit unsigned integer in the range of 0–4,294,967,295. The format little-endian, that is, the most significant byte first. |
| CRC | a 32-bit unsigned integer in the range of 0–4,294,967,295. The format is little-endian. |

For graphical representation of structures, the following format will be used, where n is the size of the field in bits:

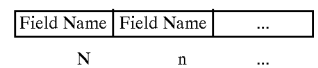

| Field Name | Field Name | ... |
|---|---|---|
| N | n | ... |

The primitive header structure is set forth below:

| wPrimitive | wRequest | wMore | wSenderType | wReserved |
|---|---|---|---|---|
| 4 | 1 | 1 | 3 | 7 |

| wID | wSequence | wSize |
|---|---|---|
| 16 | 6 | 10 |

```
typedef struct _tPrimitiveHeader
{
    WORD wReserved: 6;
    WORD wSenderType: 3;
    WORD wMore: 1;
    WORD wRequest: 1;
    WORD wPrimitive: 5;
    WORD wID;
    WORD wSize: 10;
    WORD wSequence: 6;
} PimitiveHeader;
```

Valid values for the primitive header fields are

| | |
|---|---|
| wPrimitive | One of the following set |
| | PRIMITIVE_RESOLVE = 0 |
| | PRIMITIVE_LOCATE = 1 |
| | PRIMITIVE_CALL = 2 |
| | PRIMITIVE_CONTINUE = 3 |
| | PRIMITIVE_HANGUP = 4 |
| | PRIMITIVE_SEND = 5 |
| | PRIMITIVE_RETRIEVE = 6 |
| | PRIMITIVE_DIRECTORY = 7 |
| | PRIMITIVE_CHANGEDIR = 8 |
| | PRIMITIVE_ENLIST = 9 |
| | PRIMITIVE_DEFECT = 10 |
| | PRIMITIVE_CREATEDIR = 11 |
| | PRIMITIVE_CREATEFILE = 12 |
| | PRIMITIVE_REMOVEDIR = 13 |
| | PRIMITIVE_DELFILE = 14 |
| | PRIMITIVE_CLOSEFILE = 15 |
| | PRIMITIVE_MOVEFILE = 16 |
| | PRIMITIVE_GETFILEATTR = 17 |
| | PRIMITIVE_SETFILEATTR = 18 |
| | PRIMITIVE_GETFILESIZE = 19 |
| | PRIMITIVE_SETEOF = 20 |
| | Values 21–31 are reserved and should not be used |
| wRequest | 1 = request |
| | 0 = response |
| wSenderType | SENDER_XFSC = 0 |
| | SENDER_XFSAC = 1 |
| | SENDER_XFSNS = 2 |
| | SENDER_XFSDS = 3 |
| | SENDER_XFSPM = 4 |
| | Values 5–7 are reserved and should not be used |
| wReserved | Reserved, must be 0 |
| wID | Connection unique ID. This ID will be used for all transmissions associated with this primitive (continues, responses, etc.) |
| wSequence | For the first transmission of a primitive of wID = X, this is 0. For each additional transmission associated with this ID, this number is incremented by 1. This allows for packet sequencing within the primitive communications. This must also be used by XFS services to ensure that no part of a communication is lost. |
| wSize | Size of the data segment following the header |
| | 0 >= wSize >= 500 |
| | (512 bytes – size of header) |
| | for UDP |
| | 0 >= wSize >= 1012 |
| | (1024 bytes – size of header) |
| | for TCP |

The primitive header is followed by 0 or more data structures. The type of structure following the header is determined by the wPrimitive and wrequest fields

Primitive Data Structures

Structures for the data fields are listed according to Type=ttt, Request=r where ttt is one of the defined PRIMITIVE_values, and r is 1 for a request primitive and 0 for a response primitive.

Type=PRIMITIVE_RESOLVE, Request=1

| cName | szNUID |
|---|---|
| 8 | n |

```
typedef struct _tResolveRequest
{
    unsigned char cName;
    unsigned char szNUID;
} ResolveRequest;
``` where rgcName is one of the following values:
 XFS_C=1
 XFS_AC=2
 XFS_NS=3
 XFS_DS=4
 XFS_PM=5.

Values 6–255 are reserved at this time and should not be used.

The szNUID field is the name of the XFS system to resolve against. XFS-NS's are only to respond to resolve requests if they are members of that particular XFS system. XFS names are decided upon by the network administrator, and should be unique across the network. For Internet use, it is recommended that the ASCII representation of a static, unique IP address be used. This will prevent multiple XFS vendors from selecting conflicting names.

Type=PRIMITIVE_RESOLVE, Request=0

| $cIP_1^1$ | $cIP_2^1$ | $cIP_3^1$ | $cIP_4^1$ |
|---|---|---|---|
| 8 | 8 | 8 | 8 |
| ... | ... | ... | ... |
| 8 | 8 | 8 | 8 |
| $cIP_1^n$ | $cIP_2^n$ | $cIP_3^n$ | $cIP_4^n$ |
| 8 | 8 | 8 | 8 |

```
typedef struct _tResolveResponse
{
    unsigned char cType;
    unsigned char rgcIP[4];
} ResolveRequest;
```

The values $cIP_1$ through $cIP_4$ are the numbers in the IP address for the requested servers in $cIP_1.cIP_2.cIP_3.cIP_4$ format. The number of IP addresses is determined by $|\{IP\}|=$ (wSize)/sizeof(ResolveResponse).

If the final IP address is IP_BROADCAST (255.255.255.255) and the wMore flag is 0, then there are more IP's available, and the requester should send a Continue primitive to retrieve the next block IP addresses.

If the wMore flag is 1, the final address will not be IP_BROADCAST, and the requester should expect another Resolve response primitive.

cType is the same as send with PRIMITIVE_RESOLVE, Request=1. This is returned for convenience.

Type=PRIMITIVE_LOCATE, Request=1

No data is associated with the Locate request primitive. It is simply a "ping" to make sure that the requested machine is still available.

Type=PRIMITIVE_LOCATE, Request=0

No data is associated with the Locate response primitive. The fact that a reply is generated is sufficient to imply that the located machine is processing requests.

Type=PRIMITIVE_CALL, Request=1

The data associated with the Call primitive is implementation specific. It should contain information about the client (such as name/password) or some information used to begin arbitration of credentials.

typedef unsigned char[ ] CallRequest;

While wSize could be 0 (no data), this is highly discouraged for open systems, as no security model will be implement-able and no user information or state will be known.

Type=PRIMITIVE_CALL, Request=0

The data associated with the Call primitive is implementation specific. It should contain information about the client (such as name/password) or some information used to begin arbitration of credentials.

typedef unsigned char[ ] CallResponse;

Type=PRIMITIVE_CONTINUE, Request=1

The data associated with the Continue request primitive is dependent on the last non-continue request primitive issued for this connection. e.g. The data type for a Continue request primitive in response to a Continue Send response primitive returned from a Send request primitive is the same as for a Send request primitive.

Type=PRIMITIVE_CONTINUE, Request=0

A Continue response primitive is send in response to an X primitive request. For example, if a Call request primitive is issued, and a continuation is required, the Call is answered with a Continue response primitive. The caller would then provide additional data according to the needs of the session, and return a Continue request primitive.

The data associated with the Continue response primitive is a set of data according to the last non-continue primitive request issued on this connection. If there were no prior non-continue requests on the connection, the Hangup primitive (with error) should be returned and the session terminated.

Type=PRIMITIVE_HANGUP, Request=1

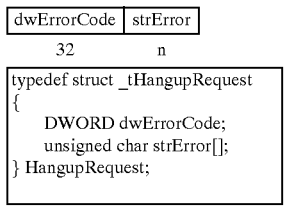

The Hangup request primitive requests termination of the current session. The receiver should note the dwErrorCode field, return the Hangup response primitive, and gracefully terminate the session.

If dwErrorCode is not 0 (ERROR_SUCCESS) then dwErrorCode is an implementation specific error about the reason for termination. Win32 error codes should be used by implementations for interoperability.

The string strError is a nul terminated human readable description of the error. While it is not required (strError[ ]==0), an application should attempt to provide an error string whenever possible.

Multiple error codes are allowed, the receiver of a Hangup request primitive should continue parsing HangupRequest data structures until wSize bytes have been consumed.

Type=PRIMITIVE_HANGUP, Request=0

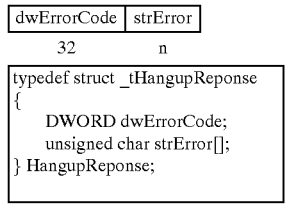

The Hangup response primitive verifies receipt of request for termination of the current session. The receiver should note the dwErrorCode field. If the field is not 0 (ERROR_SUCCESS) the receiver should terminate the session immediately (non-graceful shutdown) because and error was encountered while closing the session.

The string strError is a nul terminated human readable description of the error. While it is not required (strError[ ]==0), an application should attempt to provide an error string whenever possible. Only one Hangup response data field is allowed.

Type=PRIMITIVE_SEND, Request=1

The Send primitive sends part of all of an object to a XFS service. The system is designed so that portions of the object may be updated without transmission of the entire object. It is not necessary that a XFS service send partial objects, but all XFS systems must be able to receive them.

| dwLength | dwSection Start | Crc | dwFileID | rgcObject Data |
|---|---|---|---|---|
| 32 | 32 | 32 | 32 | n . . . | typedef DWORD CRC;

```
typedef struct _tSendRequest
{
    DWORD dwLength;
    DWORD dwSectionStart;
    CRC crc;
    DWORD dwFileID;
    unsigned char rgcObjectData[ ];   // wSize- (sizeof
                                       // (DWORD) * 4 );
};
```

A send request contains the length and the start of section identifier. dwFileID is the file identifier returned by PRIMITIVE_CREATEFILE. A CRC is calculated and send across with the primitive. This ensures correct receipt of data. The receiver of this primitive must validate the CRC and only then commit object to the persistent store. If the CRC does not match, the response will contain appropriate error code and the sender should re-send the primitive.

CRC is calculated by the formula $$CRC = \left[\sum_{i=0} (x_i^{23} + x_i^{26} + x_i^9 + x_i^5 + x_i^3 + x_i)\right] \text{MOD } 2^{32}$$

A send request primitive containing dwLength=0, dwSectionStart=0 denotes the end of the request. In a chained send, this will inform the receiver that the send is complete and it should reply with a Send response primitive. In a send/continue scenario, this informs the receiver that no more sections are required to be sent, and the transaction should be terminated with the send response primitive.

Type=PRIMITIVE_SEND, Request=0

The Send response primitive returns an error code that specifies the result of the operation. A value of 0 (ERROR_SUCCESS) indicates a successful completion of the operation. ERROR_CRC indicates that the CRC did not verify successfully.

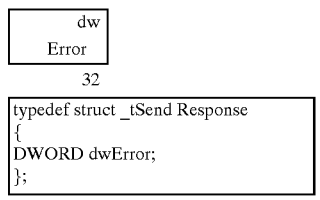

Type=PRIMITIVE_RETRIEVE, Request=1

The Retrieve request primitive is used to start the process of retrieving an object. It specifies the name of the object as well as the portion(s) it wishes to retrieve.

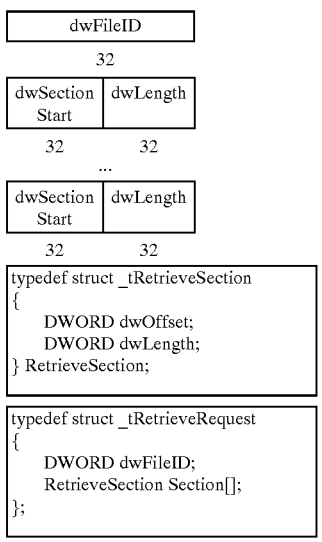

The dwFileID field contains the file identifier returned by PRIMITIVE_CREATEFILE. The RetrieveOffset array contains the sections, their starting positions, and their lengths to be retrieved. Certain combinations of values for dwOffset and dwLength mean have special meanings.

A section start of 0 and Length of 0 indicates end of retrieval by the client. Note that at present, this primitive implements only one retrieve section per request.

Type=PRIMITIVE_RETRIEVE, Request=0

The Retrieve response primitive returns the CRC and (if requested) the data from a section of the object, or the CRC of the entire object if so requested.

| crc | dwSectionStart | DwLength | dwError | rgcData |
|---|---|---|---|---|
| 32 | 32 | 32 | 32 | n |

```
typedef struct _tRetrieveResponse
{
    CRC crc;
    DWORD dwSectionStart;
    DWORD dwLength;
    DWORD dwError;
    unsigned char rgcData[ ];
} RetrieveResponse;
```

The dwError field indicates if the retrieve operation was successful. A return value of 0 (ERROR_SUCCESS) means that the operation completed successfully.

The value of the field crc is one of two values. If the dwLength==0, the crc field should be ignored since no data was sent back with the response. Otherwise, the crc field contains the CRC of the rgcData field.

Once the client gets retrieve response, it should verify the crc. If it does not mach, it should re-send the primitive across.

A Retrieve sequence is terminated by the server with either retrieve response, a return value other than 0 in dwError or length less than the requested length. If the length is less than requested length, a retrieve response is send back. Otherwise, a continue is send back from the server. The client can terminate the retrieve sequence by sending a sectionstart=0 and dwlength=0 with the retrieve request.

Type=PRIMITIVE_DIRECTORY, Request=1

The Directory request primitive requests a list of some or all objects and sub folders from 1) the current working directory of the session, 2) a directory relative to the current working directory, or 3) a specific directory.

| cFiller | cTypeMask | szDirectory | szNameMask |
|---|---|---|---|
| 8 | 8 | N | n |

```
_typedef struct _tDirectoryRequest
{
    unsigned char cTypeMask;
    unsigned char cFiller;
    unsigned char szNameMask[ ];
    unsigned char szDirectory[ ];
} DirectoryRequest;
```

The szDirectory field is a null-terminated string in one of the following formation:

| . | the current working directory |
|---|---|
| . . | the parent of the current working directory |
| [ . | . . ] \<name> | directory relative to the current working directory. <name> is the name of the relative directory and may include "\" for multiple levels of indirection |
| \<name> | directory relative to the root "\" directory, that is, a specific directory. |

The cTypeMask field contains a bitmask describing the types of objects to list. The value of the cTypeMask field is a bitwise OR of one or more of the following values ATTR_READONLY=0x01
ATTR_DIRECTORY=0x02
ATTR_ALLOBJECTS=0xFF The szNameMask field is a string that is used to filter the list of objects returned by name. The szNameMask field may be empty, in which case, all located objects matching the cTypeMask parameter are to be enumerated.

The szNameMask field may contain the "wildcard" characters '?' and '*', where

?=Any character in this location is a match.
*=Any set of characters starting at this location is a match.

cFiller is padding for 16 byte alignment required by many processors.

This is analogous to the DIR command under DOS.
Type=PRIMITIVE_DIRECTORY, Request=0

The Directory response primitive contains the names and flags of objects located by the Directory request primitives masks.

| CFlags | cFiller | szName |
|---|---|---|
| 8 | 8 | n |

```
typedef struct _tDirectoryResponse
{
    unsigned char cFlags;
    unsigned char cFiller;
        unsigned char szName[];
} DirectoryResponse;
```

The cFlags field of the DirectoryResponse structure contains a bitwise OR of the attributes of the named object. Currently, only the flags ATTR_READONLY and ATTR_DIRECTORY are defined—see "Type=PRIMITIVE_DIRECTORY, Request=1" for values of these flags.

cFiller is padding for 16 byte alignment required by many processors.

The szName field is a nul terminated string giving the canonical name of the object, sans directory information.

Type=PRIMITIVE_CHANGEDIR, Request=1

The ChangeDir request primitive requests the changing of the current working directory for the session.

| szDirectory |
|---|
| n |

```
typedef struct _tChangedirRequest
{
    unsigned char szDirectory[];
} ChangedirRequest;
``` szDirectory is a nul-terminated string in one of the following formation:

. the current working directory
.. the parent of the current working directory
[.|..]\<name> directory relative to the current working directory. <name> is the name of the relative directory and may include "\" for multiple levels of indirection.
\<name> directory relative to the root "\" directory, that is, a specific directory.

This is the only primitive for which an error does not generate a Hangup request in response. A ChangeDir request primitive will be answered with a ChangeDir response primitive with szDirectory !=szNewDirectory (see "Type=PRIMITIVE_CHANGEDIR, Request=0" below for details on the ChangeDir response primitive).

Type=PRIMITIVE_CHANGEDIR, Request=0

On Success

| szNewDirectory |
|---|
| n |

On Error

| szNewDirectory | dwError | szErrorString |
|---|---|---|
| n | 32 | n |

```
typedef struct _tChangedirResponse
{
    unsigned char szNewDirectory[];
} ChangedirResponse;
```

```
typedef struct _tChangedirError
{
    DWORD dwError;
    unsigned char szErrorString[];
} ChangedirError;
``` szNewDirectory is a nul-terminated string in one of the following formation:

. the current working directory
.. the parent of the current working directory
[.|..]\<name> directory relative to the current working directory. <name> is the name of the relative directory and may include "\" for multiple levels of indirection.
\<name> directory relative to the root "\" directory, that is, a specific directory.

If no error occurs, szNewDirectory should be equal to the szDirectory parameter from the Changedir request primitive, and only a ChangedirResponse is returned in the data portion.

If an error occurs, szNewDirectory should be the new current working directory (even if the new CWD is the same as the original CWD) and the data segment will contain a ChangedirResponse structure followed by a ChangedirError structure.

Type=PRIMITIVE_ENLIST, Request=1

The Enlist request primitive is used to register new XFS servers with the XFS-NS's. The enlistment/defect scenarios are meant for permanent addition and removal of servers. Limited removal from the system is accomplished though the fact that XFS servers will not respond to a Locate request primitive when inactive or disabled.

| cType | cIP$_1$ | cIP$_2$ | cIP$_3$ | cIP$_4$ | szNUID |
|---|---|---|---|---|---|
| 8 | 8 | 8 | 8 | 8 | n |

```
typedef struct _tEnlistRequest
{
    unsigned char cType;
    unsigned char cIP[4];
    unsigned char szNUID[];
} EnlistRequest;
```

The cType location contains the type of XFS server being registered. It can be one of the following values:
XFS_C=1*
XFS_AC=2
XFS_DS=3
XFS_NS=4
XFS_PM=5

Values 6–255 are reserved at this time and should not be used.

The enlistment of a XFS-C is not maintained in the XFS-NS. It is supplied so that clients may locate the XFS-NS's without prior knowledge of the network topography. As such, there is no need to defect a XFS-C from the network.

The cIP fields contain the IP address of the enlisting box in cIP1.cIP2.cIP3.cIP4 format.

The szNUID field is the name of the XFS system to enlist with. XFS-NS's must only respond to enlist requests if they are members of that particular XFS system. XFS names are decided upon by the network administrator, and should be unique across the network. For Internet use, it is recommended that the ascii representation of a static, unique IP address be used. This will prevent multiple XFS vendors from selecting conflicting names.

Multiple Enlist Request structures may be present. This allows a multi-homed box to register several IP addresses, or a package implementing multiple XFS services to register all services at the same time.

If more enlistment's are required than the data segment of the datagram will support, the enlisting service(s) must send separate Enlist requests for each block of IP's. Neither datagram chaining nor the continue scenario is supported for enlistment.

Type=PRIMITIVE_ENLIST, Request=0

The Enlist response primitive is sent from a XFS-NS to notify an enlisting server that the enlistment into the XFS system has succeeded.

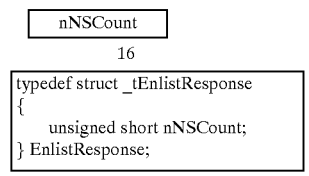

The nNSCount field contains the number of XFS-NS's currently known to the system so that the enlisting box will know when all XFS-NS's have succeeded in registering the enlistment.

Type=PRIMITIVE_DEFECT, Request=1

The Defect request primitive is sent to remove the requester from the XFS-NS's namespace. The requestor must issue a Defect request for every Enlist request that was previously registered.

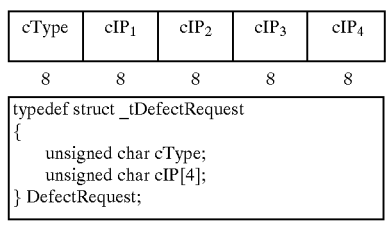

The Defect request primitive data is substantially identical to the EnlistRequest primitive data. See the above information in "Type=PRIMITIVE_ENLIST, Request=1" for details on data values and semantics.

Type=PRIMITIVE_DEFECT, Request=0

The Defect request primitive notifies the defecting server that the defect has been registered on a XFS-NS.

There is no data associated with the Defect request primitive.

Type=PRIMITIVE_CREATEDIR, Request=1

The CreateDir primitive requests the creation of a new directory. The directory could be a new directory in the current directory for the session, new directory relative to the current directory for the session or a specific directory.

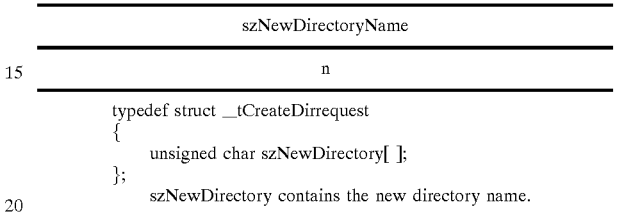

Type=PRIMITIVE_CREATEDIR, Request=0
CreateDir response indicates the result of the operation.

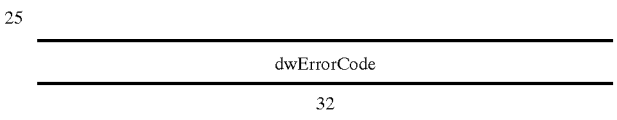

A return value of 0 (ERROR_SUCCESS) indicates the operation completed sucessfully.

Type=PRIMITIVE_CREATEFILE, Request=1

The CreateFile primitive requests creation of a new file or open an existing file.

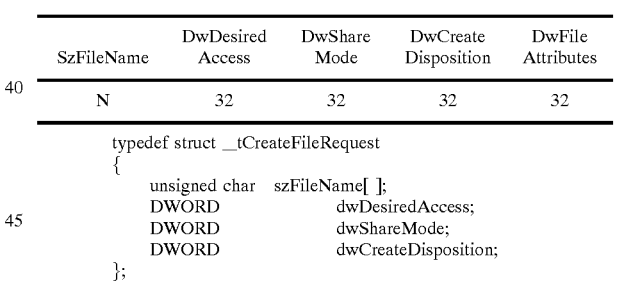

szFileName can be file in the current directory for the session, relative directory to the current directory for the session or a specific directory in object store.

dwDesiredAccess specifies the type of access to the file. This is an implementation specific parameter that goes across with the primitive. Typical types of access would be read, write or both.

dwShareMode specifies how the file can be shared. Setting this field to 0 implies the file cannot be shared. Other sharing modes are implementation specific parameter. Typical types of sharing modes would be share for read and share for write.

dwCreateDisposition the actions that can be taken on files that exist and files that do not exist. Following actions may be supported Create New, Create Always, Open Existing, Open Always and Truncate Existing. The implementation of these actions is left to the developer.

dwFileAttributes specifies the attributes for the file. This is an implementation specific parameter.

Type=PRIMITIVE_CREATEFILE, Request=0
CreateFile response indicates the result of operation.

| dwFileID | DwError |
|---|---|
| 32 | 32 |

```
typedef struct _tCreateFileResponse
{
    DWORD dwFileID;
    DWORD dwError;
};
``` dwFileID is the ID of the newly created or opened file. This is set to 0xFFFFFFFF (INVALID_HANDLE_VALUE) if the operation is unsuccessful.

dwError is set to 0 (ERROR_SUCCESS) if the primitive succeeds. A non-zero value indicates an error in operation.

Type=PRIMITIVE_REMOVEDIR, Request=1

The RemoveDir primitive requests deletion of an existing empty directory. The directory to be removed can be relative to the current directory for the session or a directory in the current directory in the session or a specific directory.

| SzDirectoryName |
|---|
| N |

```
typedef struct _tRemoveDirRequest
{
    unsigned char szDirectoryName[ ];
};
``` szDirectoryName is the name of the directory to be removed.

Type=PRIMITIVE_REMOVEDIR, Request=0

RemoveDir response indicates the result of RemoveDir operation.

| dwError |
|---|
| 32 |

```
typedef struct _tRemoveDirResponse
{
    DWORD dwError;
};
``` dwError is set to 0 (ERROR_SUCCESS) if the operation succeeds.

Type=PRIMITIVE_DELFILE, Request=1

DelFile primitive requests deletion of an existing file. The file to be deleted can be in the current directory for the session, directory relative to the current directory for the session or a specific directory.

| szFileName |
|---|
| N |

```
typedef struct _tDelFileRequest
{
    unsigned char szFileName[ ];
};
``` szFileName is the name of the file to be deleted.

Type=PRIMITIVE_DELFILE, Request=0

DelFile response indicates the result of DelFile operation.

| dwError |
|---|
| 32 |

```
typedef struct _tDelFileResponse
{
    DWORD dwError;
};
``` dwError is set to 0 (ERROR_SUCCESS) if the operation succeeds.

Type=PRIMITIVE_CLOSEFILE, Request=1

CloseFile closes the file either created or opened by CreateFile primitive.

| dwFileID |
|---|
| 32 |

```
typedef struct _tCloseFileRequest
{
    DWORD dwFileID;
};
``` dwFileID is the file identifier returned by CreateFile primitive.

Type=PRIMITIVE_CLOSEFILE, Request=0

CloseFile response identifies the result of CloseFile operation. If the file could not be closed, it must be closed once the session terminates.

| dwError |
|---|
| 32 |

```
typedef struct CloseFileResponse
{
    DWORD dwError;
};
``` dwError is set to 0 (ERROR_SUCCESS) if the operation succeeds.

Type=PRIMITIVE_MOVEFILE, Request=1

MoveFile primitive renames an existing file or a directory.

| SzExistingFileName | SzNewFileName |
|---|---|
| N | N |

```
typedef struct _tMoveFileRequest
{
    unsigned char szExistingFileName[ ];
    unsigned char szNewFileName[ ];
};
``` szExistingFileName is a null terminated string that names an existing file or directory.

szNewFileName is a null terminated string that specifies a new name for the file or directory.

Type=PRIMITIVE_MOVEFILE, Request=0

MoveFile response indicates the result of MoveFile operation.

| dwError |
|---|
| 32 |

```
typedef struct _tMoveFileResponse
{
    DWORD dwError;
};
``` dwError is set to 0 (ERROR_SUCCESS) if the operation succeeds.

Type=PRIMITIVE_GETFILEATTR, Request=1
GetFileAttr requests the attributes for a specified file or a directory.

| szFileName |
|---|
| NULL terminated str |

```
typedef struct _tGetFileAttrRequest
{
    unsigned char szFileName[ ];
};
``` szFileName is a null terminated string that specifies the name of the file or directory.

Type=PRIMITIVE_GETFILEATTR, Request=0
GetFileAttr response contains the attributes of the requested file or directory and a error code.

| DwAttr | dwError |
|---|---|
| 32 | 32 |

```
typedef struct _tGetFileAttrResponse
{
    DWORD dwAttr;
    DWORD dwError;
};
``` dwAttr is a 32 bit value specifying the attributes for the file. This value is meaningful if dwError is set to 0 (ERROR_SUCCESS). The actual values of the attributes are implementation specific and are the same as implemented in CreateFile primitive.
dwError is set to 0 is the operation succeeded.

Type=PRIMITIVE_SETFILEATTR, Request=1
SetFileAttr requests setting of the file attributes.

| SzFileName | DwAttr |
|---|---|
| N | 32 |

```
typedef struct _tSetFileAttr
{
    unsigned char szFileName[ ];
    DWORD dwAttr;
};
``` szFileName is a null terminated string that specifies the name of the file whose attributes are to be set.

dwAttr is a 32 bit value specifying the attributes for the file. The actual values of the attributes are implementation specific and are the same as implemented in CreateFile primitive.

Type=PRIMITIVE_SETFILEATTR, Request=0
SetFileAttr response indicates the result of SetFileAttr a operation.

| dwError |
|---|
| 32 |

```
typedef struct _tSetFileAttrResponse
{
    DWORD dwError;
};
``` dwError is set to 0 (ERROR_SUCCESS) if the operation succeeds.

Type=PRIMITIVE_GETFILESIZE, Request=1
GetFileSize requests the file size for a given file id. The file should be opened using CreateFile primitive prior to invoking this primitive.

| dwFileID |
|---|
| 32 |

```
typedef struct _tGetFileSizeRequest
{
    DWORD   dwFileID;         //File ID
}GetFileSizeRequest;
``` dwFileID is set to the file id returned by CreateFile Primitive.

Type=PRIMITIVE_GETFILESIZE, Request=0
GetFileSize response indicates the result of GetFileSize operation.

| dwFileSize | dwRetCode |
|---|---|
| 32 | 32 |

```
typedef struct _tGetFileSizeResponse
{
    DWORD   dwFileSize;       //File Size. -1 if error
    DWORD   dwRetCode;        //Return Code for the operation
}GetFileSizeResponse;
``` dwFileSize contains the file size if the primitive is successful. In case of failure, this is set to 0xFFFFFFFF.
dwRetCode specifies if the operation is successful. This field is set to ERROR_SUCCESS if successful. Otherwise, an implementation specific error code must be returned in this field.

Type=PRIMITIVE_SETEOF, Request=1
SetEOF primitive set's the EOF at the current position in the file.

| dwFileID |
|---|
| 32 |

```
typedef struct _tSetEOFRequest
{
    DWORD   dwFileID;         //File ID
}SetEOFRequest;
``` dwFileID is set to file id returned by CreateFile primitive.
Type=PRIMITIVE_SETEOF, Request=0

SetEOF response indicates the result of SetEOF operation.

---
dwRetCode

32
---
typedef struct _tSetEOFResponse
{
    DWORD    dwRetCode;    //Return Code of the operation
}SetEOFResponse;
--- dwRetCode is set to ERROR_SUCCESS if the operation completes successfully. In case of error, an implementation specific error is set in this field.

Type=XfsTICKET

The following structure defines the ticket send across by the server in the PRIMITIVE_CALL Response after authentication.

```
        struct XfsTicket
        {
            enum
            {
                SIZE=256
            };
            DWORD         m_dwLength;
            unsigned char m_bData[SIZE];
        };
```

XFS Communications—IP and Link Layer

The XFS system specifies two types of transport for primitives, UDP and TCP. UDP and TCP communications are conducted on separate IP ports. It is recommended that port 171 be used for UDP communications and port 172 used for TCP communications. However, any available port could be configured for TCP and UDP communications.

Session primitives are restricted to TCP transport. Control primitives—which are UDP capable—are capable of being used with UDP broadcast. Primitives are listed in the table below with the types of transports that may be used with them. Available transports are denoted by an 'x' in the transport column. The preferred transport(s) for the primitive is denoted by a capital 'X'.

| Primitive | TCP | UDP | Broadcast |
|---|---|---|---|
| Resolve request | X | x | |
| Resolve response | X | x | |
| Locate request | x | X | |
| Locate response | x | X | |
| Call request | X | | |
| Call response | X | | |
| Continue request | X | | |
| Continue response | X | | |
| Hang Up request | X | | |
| Hang Up response | X | | |
| Send request | X | | |
| Send response | X | | |
| Retrieve request | X | | |
| Retrieve response | X | | |
| Directory request | X | | |
| Directory response | X | | |
| ChangeDir request | X | | |
| ChangeDir response | X | | |
| Enlist request | x | x | X |
| Enlist response | x | x | |
| Defect request | x | x | X |
| Defect response | x | x | |
| CreateDir Request | X | | |
| CreateDir Response | X | | |
| CreateFile Request | X | | |
| CreateFile Response | X | | |
| RemoveDir Request | X | | |
| RemoveDir Response | X | | |
| DelFile Request | X | | |
| DelFile Response | X | | |
| CloseFile Request | X | | |
| CloseFile Response | X | | |
| MoveFile Request | X | | |
| MoveFile Request | X | | |
| GetFileAttr Request | X | | |
| GetFileAttr Response | X | | |
| SetFileAttr Request | X | | |
| SetFileAttr Response | X | | |
| GetFileSize Request | X | | |
| GetFileSize Response | X | | |
| SetEOF Request | X | | |
| SetEOF Response | X | | |

As can be seen from the foregoing detailed description, there is provided a method and system wherein a client device has access to an entire file system with large storage capacity when a physical connection is present, even with limited memory resources. The system and method are fast, efficient, scalable and secure. The client device works with locally-cached data, and thus may work without a physical connection, and then upload any changes at a later time. While the present invention thus provides particular benefit with the Internet, it also provides numerous other benefits to computer users in general. Note further that the present invention need not be limited to hierarchically arranged directories of files, but may alternatively be used with other arrangements of data.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method of providing access to file system object data, comprising:

receiving a request to read data from a client application, the data residing on at least one of a local and a remote source, the client application being unaware of where the data resides, wherein the remote source includes a plurality of servers that are enlisted to provide the data;

determining where the data resides;

if the data does not reside on the local source, retrieving the data from the remote source and storing at least some of the data on the local source; otherwise retrieving the data from the local source;

providing the data to the client application;

receiving a request from the client application to modify the data;

modifying at least some of the data that is stored on the local source; and automatically updating the data on the remote source to synchronize the data on the remote source with the data on the local source, wherein a server enlists to provide the data by performing acts, comprising:

sending an enlist primitive to notify the plurality of servers that the server wants to participate in providing the data; and receiving a response from at least one of the plurality of servers.

2. The method of claim 1, wherein the at least some of the data that is stored in the local source is stored in memory that serves as a file system.

3. The method of claim 2, wherein the memory serves as a ramdisk.

4. The method of claim 1, wherein the at least some of the data that is stored on the local source is stored in main memory, the main memory not serving as a file system.

5. The method of claim 4, wherein the data is part of an object that is marked as synchronize-always and wherein the data is always retrieved from the remote source when a request to read the data is received.

6. The method of claim 1, wherein the data is part of an object marked as local-always, wherein after the data is retrieved from the remote source, the data remains on the local source and is not removed via a least-recently-used algorithm employed to make room on the local source for other data.

7. The method of claim 1, wherein the data is transmitted via a connection that is created just before the data is transmitted and that is destroyed immediately thereafter.

8. The method of claim 1 wherein determining where the data resides comprises accessing attributes of an object associated with the data.

9. The method of claim 1, wherein the server that is enlisting to provide the data performs further acts, comprising resending the enlist primitive to any of the plurality of servers that has not responded to the enlist primitive.

10. The method of claim 9, wherein resending the enlist primitive is transmitted directly to servers that have not responded.

11. The method of claim 1, wherein the enlist primitive is sent via a broadcast.

* * * * *

UNITED STATES PATENT AND TRADEMARK OFFICE
CERTIFICATE OF CORRECTION

PATENT NO. : 6,754,696 B1
DATED : June 22, 2004
INVENTOR(S) : Kamath et al.

It is certified that error appears in the above-identified patent and that said Letters Patent is hereby corrected as shown below:

Title page,
Item [73], Assignee, "Micosoft Corporation" should read
-- Microsoft Corporation --.

Signed and Sealed this

Second Day of August, 2005

JON W. DUDAS
*Director of the United States Patent and Trademark Office*